United States Patent

Tsai et al.

[11] Patent Number: 5,867,456
[45] Date of Patent: Feb. 2, 1999

[54] INTELLIGENT OPTICAL DISK DRIVE CONTROL METHOD

[75] Inventors: Fang-Juh Tsai, Changhua; Bing Fei Wu; Shih-Tung Cheng, both of Hsinchu, all of China

[73] Assignee: Industrial Technology Research Institute, Taipei, Taiwan

[21] Appl. No.: 929,805

[22] Filed: Sep. 15, 1997

[51] Int. Cl.$^6$ .................................................. G11B 17/22
[52] U.S. Cl. ........................................... 369/32; 369/44.11
[58] Field of Search ........................... 369/32, 13, 44.11, 369/44.14, 44.26, 44.39; 360/77.01, 70, 77.13

[56] References Cited

U.S. PATENT DOCUMENTS 5,424,886  6/1995  Tomitaka .............................. 360/77.01

*Primary Examiner*—Ali Neyzari
*Attorney, Agent, or Firm*—W. Wayne Liauh

[57] ABSTRACT

An intelligent optical disk drive control method for rapidly and accurately controlling the movement of an optical pick-up head of an optical disk drive, including the steps of: (a) defining a movement mode for the optical pick-up head; (b) providing a reference message according to the movement mode defined by step (a); (c) moving the optical pick-up head according to the reference message provided by step (b), and providing a feedback message subject to the actual movement of the optical pick-up head when the optical pick-up head is moved; and (d) comparing the feedback message with the reference message, then using a fuzzy control and a proportional integration control to adjust the movement mode of the optical pick-up head subject to the comparison result, so as to let the actual movement mode of the optical pick-up head follow the predetermined movement mode.

19 Claims, 22 Drawing Sheets

INTELLIGENT OPTICAL DISK DRIVE CONTROL METHOD

BACKGROUND OF THE INVENTION

The present invention relates to an intelligent optical disk drive control method for rapidly and accurately controlling the movement of an optical pick-up head of an optical disk drive system. The term, optical disk means a device which utilizes the optical method to read data from the disk.

The hardware structure of a conventional optical disk drive, as shown in FIG. 1, comprises at least: a disk 10, a spindle motor 11, a base plate 12, an optical pick-up head 13 which includes an optical system and a lens actuator, and a sled motor 14 adapted for driving the optical pick-up head 13 for long tracking. The optical system comprises at least a focus lens adapted to focus a laser light onto the disk. The lens actuator comprises a coil adapted for driving the focus lens for tracking and short seeking. The aforesaid hardware devices are controlled by the following servo control systems:

1. Focusing Servo Control: for controlling the movement of a focusing actuator which is equipped with the aforesaid focusing lens, permitting laser light which passes through the focusing lens to be focused onto the disk 10.
2. Sled Servo Control: for moving the optical pick-up head 13 to the object track or its nearby area at a high speed when accessing data.
3. Fine Seeking, Tracking Servo Control: for matching with the sled servo control to control the coil in driving the focusing lens for a fine movement, enabling the optical pick-up head to follow a certain track in the disk 10, so that tracking servo control can be performed to achieve the action of tracking; fine seeking servo control is for track jumping control, and track jumping is one track per each jump.
4. Spindle Servo Control: for controlling the spindle motor 11 to turn the disk 10, causing the optical pick-up head to pick up the data continuously from the disk 10 along a fixed track.

The data access procedure of an optical disk drive is outlined hereinafter with reference to FIG. 2.
1. turning the disk 10;
2. projecting a laser beam onto the disk 10;
3. focusing the laser beam;
4. tracking - - - turning on the lens actuator to drive the object lens, enabling the laser beam to follow a certain data track;
5. picking up track number - - - reading out the existing track number so as to know the existing track position;
6. sled - - - turning on the sled motor 14 to move the optical pick-up head 13 from the existing track to a nearby area around the object track;
7. tracking;
8. picking up track number - - - reading out the existing track number so as to know the difference between the existing track and the object track;
9. short seeking - - - fine adjusting the coil to move the object lens, enabling the laser beam to be focused onto the object track;
10. tracking;
11. accessing data.

The access time of an optical disk drive means the total time used in the aforesaid (6) to (11) six actions. Normally, the time for sled is the longest. Therefore, the servo control of the sled motor 14 has a great concern with the access time. The present invention is achieved to improve the servo control of the sled motor 14, so as to reduce the consumption of the access time.

Using a PID (proportional integrated differentiation) control method to control the servo control of the sled motor of an optical disk drive has been well known. However, the control system parameter of the PID control method tends to cause a floating change when the optical disk drive bears a heavy disk, gaps occur in the transmission mechanism, mechanical parts are aged, or the friction force is changed. Therefore, this conventional optical disk drive control method cannot fit the changes of the control system parameter, and the optical pick-up head positioning time will be increased.

SUMMARY OF THE INVENTION

It is one object of the present invention to provide an optical disk drive control method which combines a fuzzy control and a PID control into a system for efficiently controlling the velocity of the sled motor, so as to reduce the access time of the optical disk drive. It is another object of the present invention to provide an optical disk drive control method which eliminates the problem of inaccurate system judgment and the problem of nonlinear and system parameter design error, and can accurately and rapidly allocate the optical pick-up head.

The optical disk drive fuzzy control method of the present invention is adapted to control the movement of an optical pick-up head. The method includes the steps of: (a) predetermining the movement mode of the optical pick-up head; (b) providing a reference message subject to the movement mode determined by step (a); (c) moving the optical pick-up head subject to the reference message provided by step (b) and providing a feedback message subject to the actual movement of the optical pick-up head; and (d) comparing the feedback message obtained from step (c) with the reference message, and changing the movement mode of the optical pick-up head by means of a fuzzy control and a PID control, so as to let the movement mode of the optical pick-up head rapidly follow the predetermined movement mode.

The step (a) of predetermining the movement mode of the optical pick-up head is to accelerate the movement of the optical pick-up head to a designated velocity, then to keep the optical pick-up head moving at the designated velocity, and then to slow down the velocity of the optical pick-up head by negative acceleration when approaching the destination, so as to let the optical pick-up head be stopped at the desired location.

The process of the step (a) of predetermining the movement mode of the optical pick-up head can be shown by a time-velocity equilateral trapezium curve.

The area below the equilateral trapezium curve is the distance within which the optical pick-up head is to be moved. The optical pick-up head is driven by a sled motor at the maximum acceleration, and then moved at a constant velocity when the sled motor reaches its maximum velocity. When approaching the destination, the velocity of the sled motor is reduced at its maximum negative acceleration, enabling the optical pick-up head to be stopped at the designated location.

The step (a) of predetermining the movement mode of the optical pick-up head is to determine the moving velocity of the optical pick-up head during its movement subject to the distance at which the optical pick-up head needs to be moved.

The reference message can be a reference velocity signal for enabling the velocity of the optical pick-up head to follow the velocity to which the reference velocity signal corresponds.

The reference velocity signal can be produced by a CPU (central processing unit) by calculating the distance at which the optical pick-up head needs to be moved subject to the movement mode of the optical pick-up head determined at the aforesaid step (a).

The reference message of the step (b) may include a digital reference velocity signal. The digital reference velocity signal can be obtained from a digital controller, and converted into an analog reference velocity signal by a digital/analog converter, and then inputted into a driver, causing it to drive the optical pick-up head. The digital controller can be a CPU.

The feedback message of the step (c) can be a velocity feedback signal representing the actual moving velocity of the optical pick-up head, and the velocity feedback signal is sent back to the digital controller. The driver can be a driving motor and its driving circuit. The velocity feedback signal is produced by a feedback device. The feedback device produces an analog feedback signal subject to the actual velocity of the optical pick-up head driven by the driver. The analog feedback signal is then converted into a digital velocity feedback signal by an analog/digital converter, and the digital velocity feedback signal is then sent back to the digital controller.

In the aforesaid step (d), the digital controller processes the digital reference velocity signal and the digital feedback signal. The digital controller comprises a PI (proportional integration) controller and a fuzzy controller for employing a proportional integration and a fuzzy control to the driving motor.

The PI controller is designed subject to the transfer function of the driving motor. The fuzzy controller is for fine adjustment to prevent the occurrence of a steady-state oscillation. When there is a difference between the actual velocity of the velocity feedback signal and the ideal velocity of the reference velocity signal, the fuzzy controller immediately provides a control voltage to the driving motor, causing it to follow up the expected ideal velocity. The aforesaid fuzzy controller is a PD (proportional differential) fuzzy controller.

The aforesaid step (d) further includes the sub-steps of (d1) comparing the speed feedback signal with the digital reference speed signal, so as to find out at least one speed error (e) between the actual speed of the driving motor and the set point of the reference speed curve; (d2) calculating the error variation ($\Delta e$) of the speed errors (e) between two adjacent time states subject to the speed error (e) between the actual speed of the driving motor and the set point of the reference speed curve; and (d3) providing a compensation signal for controlling the speed of the driving motor subject to a fuzzy rules chart which corresponds to the speed error (e) and the error variation ($\Delta e$). The fuzzy rules chart is established according to experts' experience. The fuzzy controller is operated according to the fuzzy rules chart. When the value of the error variation ($\Delta e$) is close to zero and the value of the speed error (e) is a small negative value during the establishment of the fuzzy rules chart, the relative compensation signal prohibits the actual moving speed of the driving motor to cause an over shoot. When the value of the error variation ($\Delta e$) is close to zero and the value of the speed error (e) is a small positive value during the establishment of the fuzzy rules chart, the relative compensation signal is zero to buffer the descending speed of the driving motor, so as to compensate the error caused by the increasing of friction force during the increasing of the actual moving speed of the driving motor. After step (d), the method further comprises the steps of: (e) integrating the actual moving speed of the driving motor represented by the feedback message of step (d), so as to obtain the actual displacement of the optical pick-up head; and (f) comparing the actual displacement of the optical pick-up head with its predetermined displacement, then switching to a positioning control when the optical pick-up head is moved to nearby the predetermined position, so as to let the optical pick-up head be accurately positioned at the predetermined position. The digital controller comprises a proportional controller during the positioning control. The proportional controller is a reference speed generator before entering the positioning control. The driving motor can be a voice coil motor directly coupled to the optical pick-up head. Alternatively, the driving motor can be a DC motor coupled to the optical pick-up head by a transmission mechanism.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
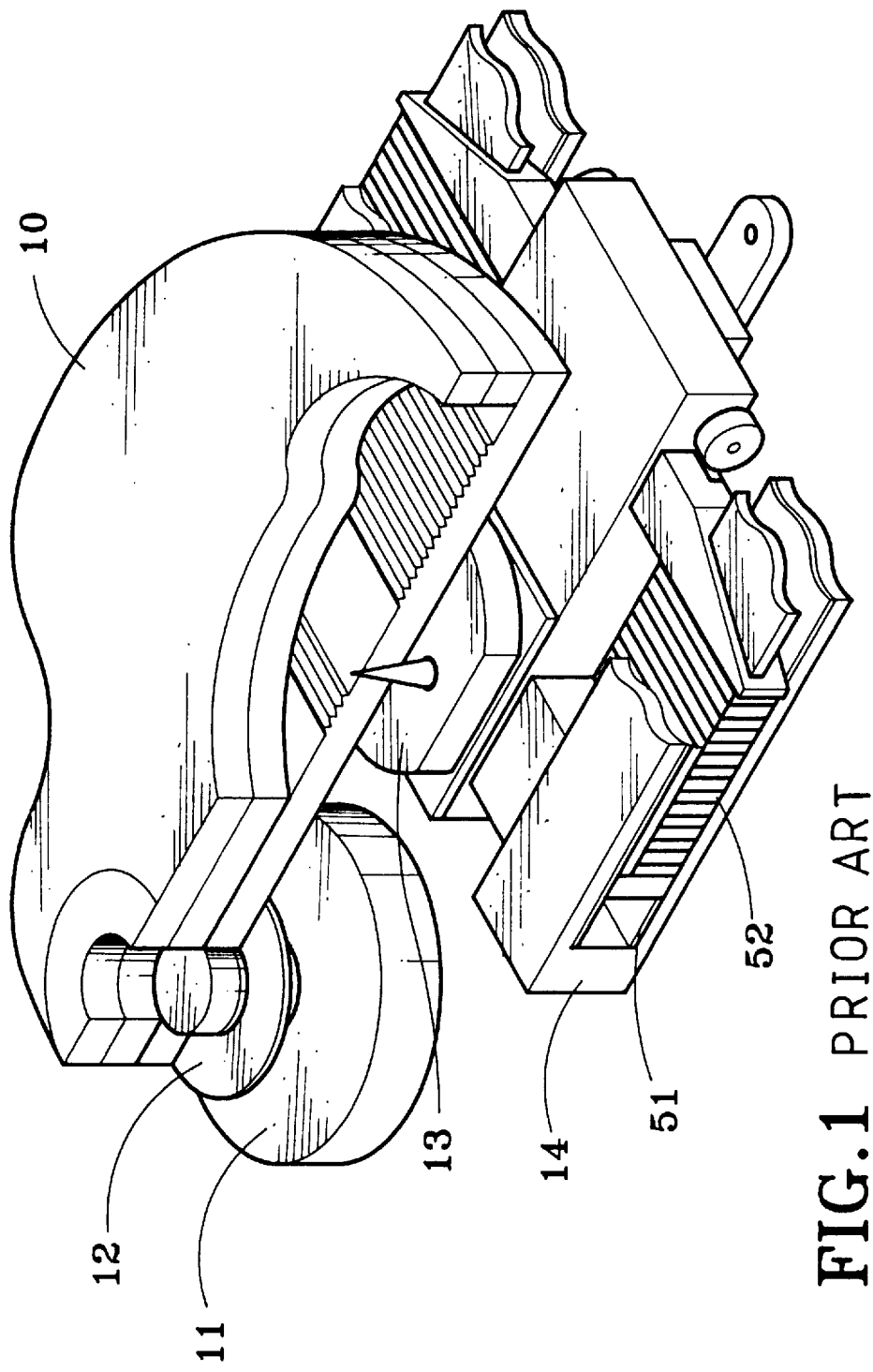
FIG. 1 shows the structure of an optical disk drive.
Figure 2:
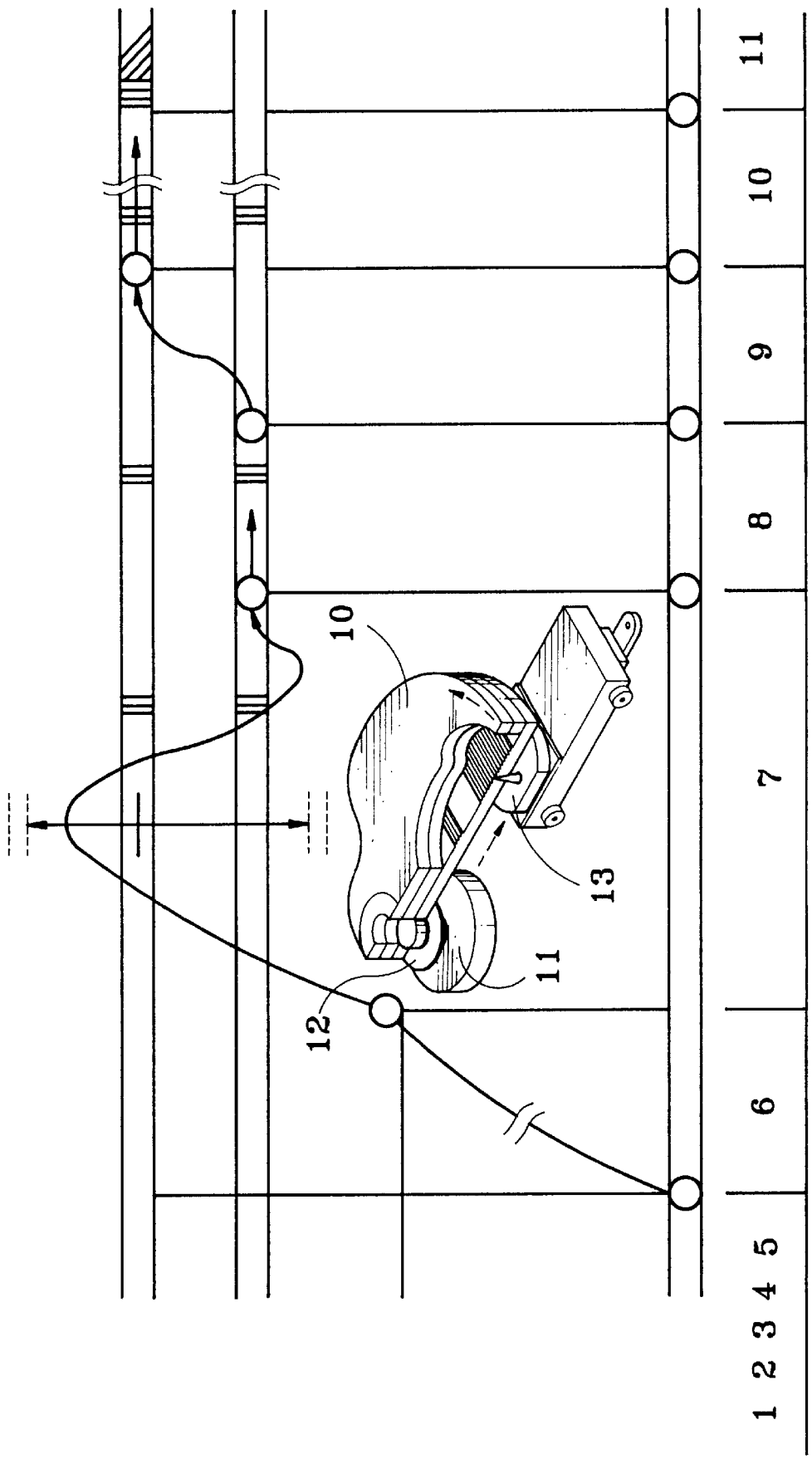
FIG. 2 illustrates the access procedure of an optical disk drive.
Figure 3:
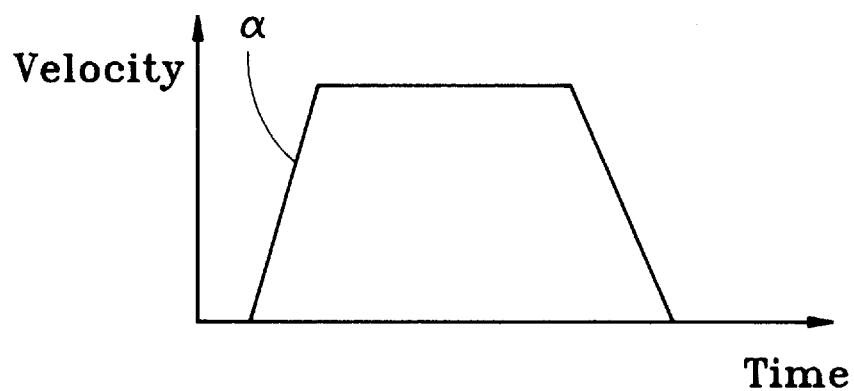
FIG. 3 is a reference speed curve used according to the present invention.

The present invention relates to an optical disk drive fuzzy control method adapted to rapidly and accurately control the movement of an optical pick-up head. The basic principle of the present invention is to predetermine a movement mode, then causing the optical pick-up head be moved subject to the predetermined movement mode and to dynamically adjusting the optical pick-up head during its movement, thus enabling the actual movement mode of the optical pick-up head to be maintained close to the predetermined movement mode. After the end of the predetermined movement mode, the optical pick-up head is disposed close to the predetermined location within a certain accuracy, and therefore the optical pick-up head can rapidly reach the predetermined location. The optical pick-up head can be the optical pick-up head 13 of FIG. 1 which is driven by a sled motor 14. By means of controlling the velocity of the sled motor 14 by a voltage signal, the movement of the optical pick-up head 13 is controlled. The first step of the control method of the present invention is to define the movement mode of the optical pick-up head 13. The process is shown in FIG. 3 by a time-velocity curve, in which the longitudinal coordinate indicates the velocity and the transverse coordinate indicates the time; the curve a is a reference velocity curve shown in the form of a equilateral trapezium which represents: the sled motor 14 is expected to drive the optical pick-up head 13 from zero velocity to the maximum velocity, then to keep the optical pick-up head 13 moving at the maximum velocity, and then to slow down the velocity of the optical pick-up head by negative acceleration when approaching the destination, enabling the optical pick-up head to be stopped at the desired location. Therefore, the area below the reference velocity curve a is the displacement in which the optical pick-up head 13 shall have to move. Why a trapezoidal curve is selected? Why not a triangular curve? This is because the area of a trapezium can be easily calculated. When to command the optical pick-up head 13 to move forwardly to a certain distance, a trapezoidal curve of same distance can be immediately figured out. Further, when the optical pick-up head 13 is changed from a uniform acceleration to a constant velocity movement, less input variation is caused to happen. However, if a triangular reference speed curve is chosen, the velocity must be increased by maximum acceleration and then reduced by maximum negative acceleration. A sharp input variation will occur when the movement mode is changed, thereby causing the system to be easily damaged, and the desired control cannot be easily achieved.

Figure 5:
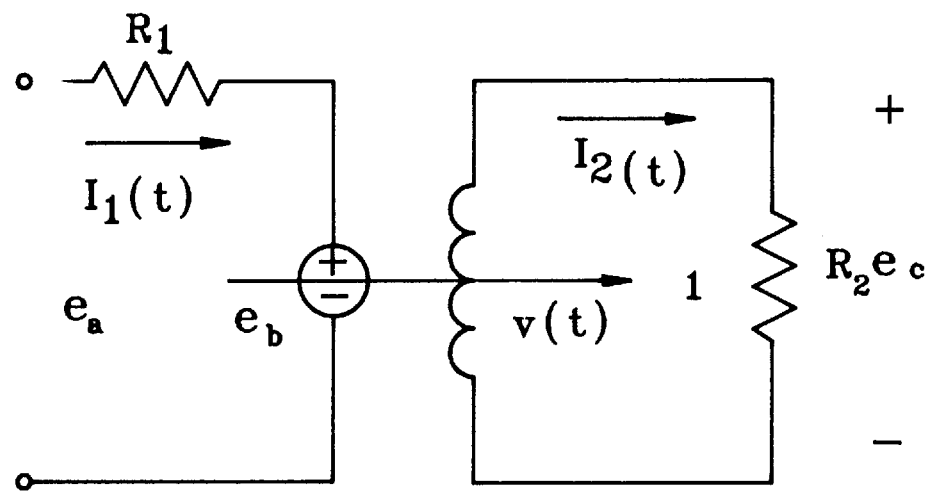
FIG. 5 is a circuit diagram of an equivalent circuit of the voice coil motor according to the present invention.
Figure 6:
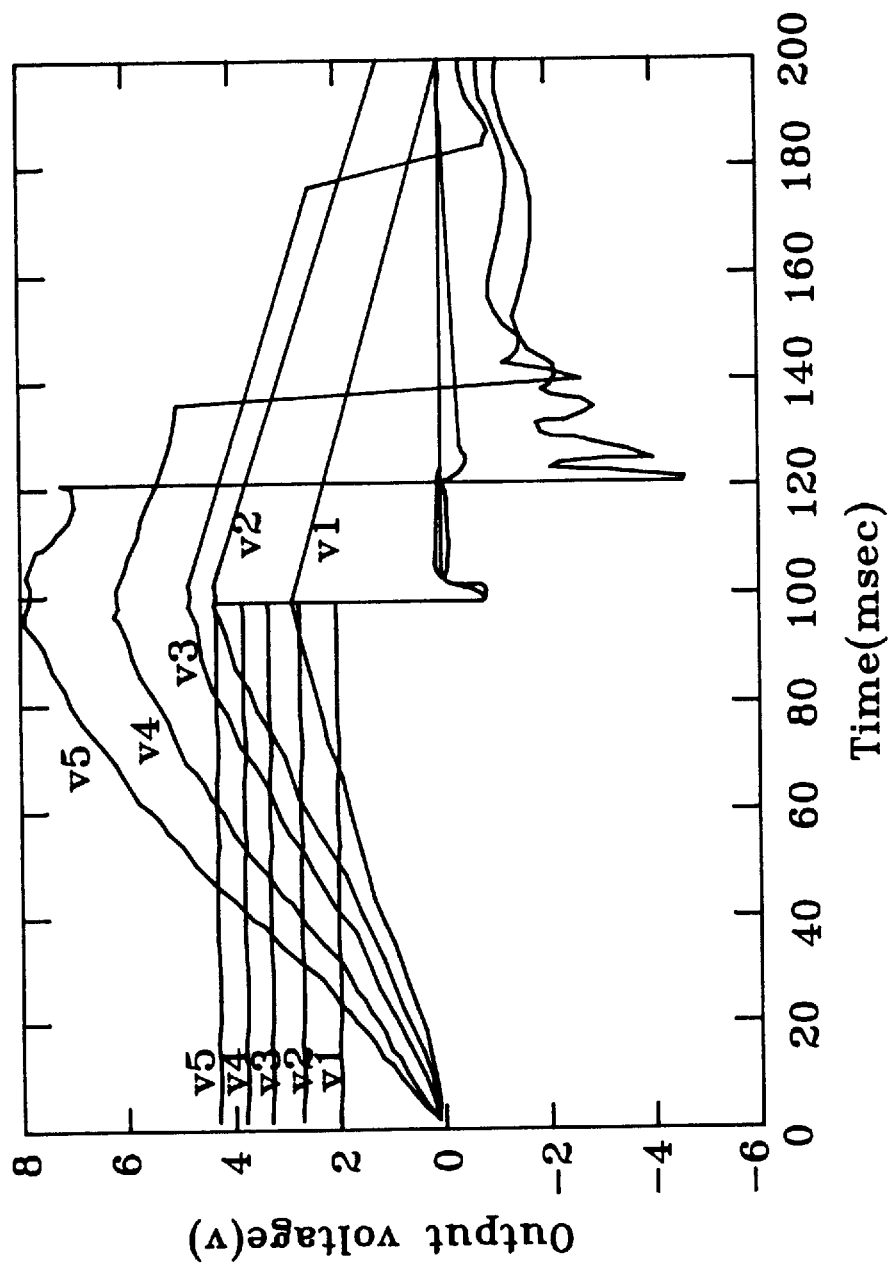
FIG. 6 is a step response chart of the voice coil motor according to the present invention.
Figure 7:
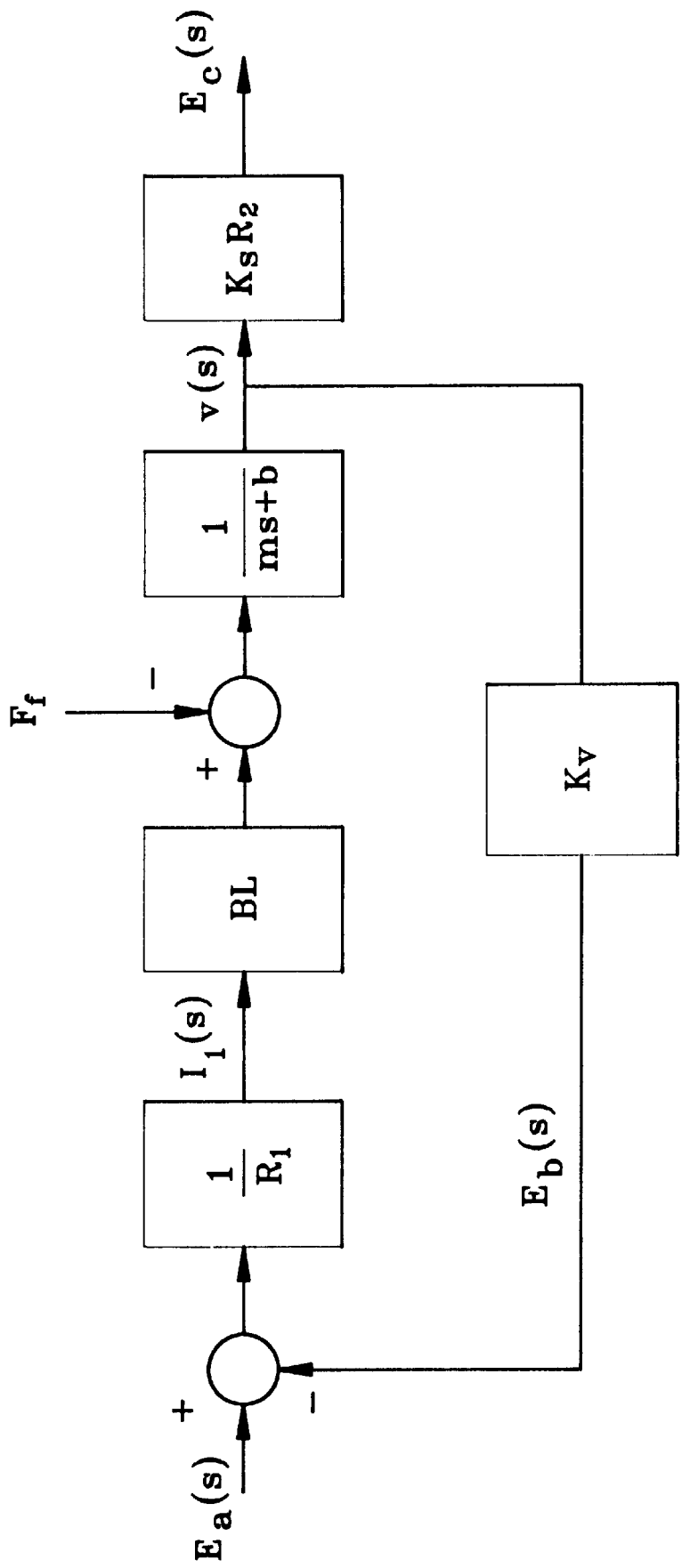
FIG. 7 is a system block diagram of the voice coil motor according to the present invention.
Figure 8:
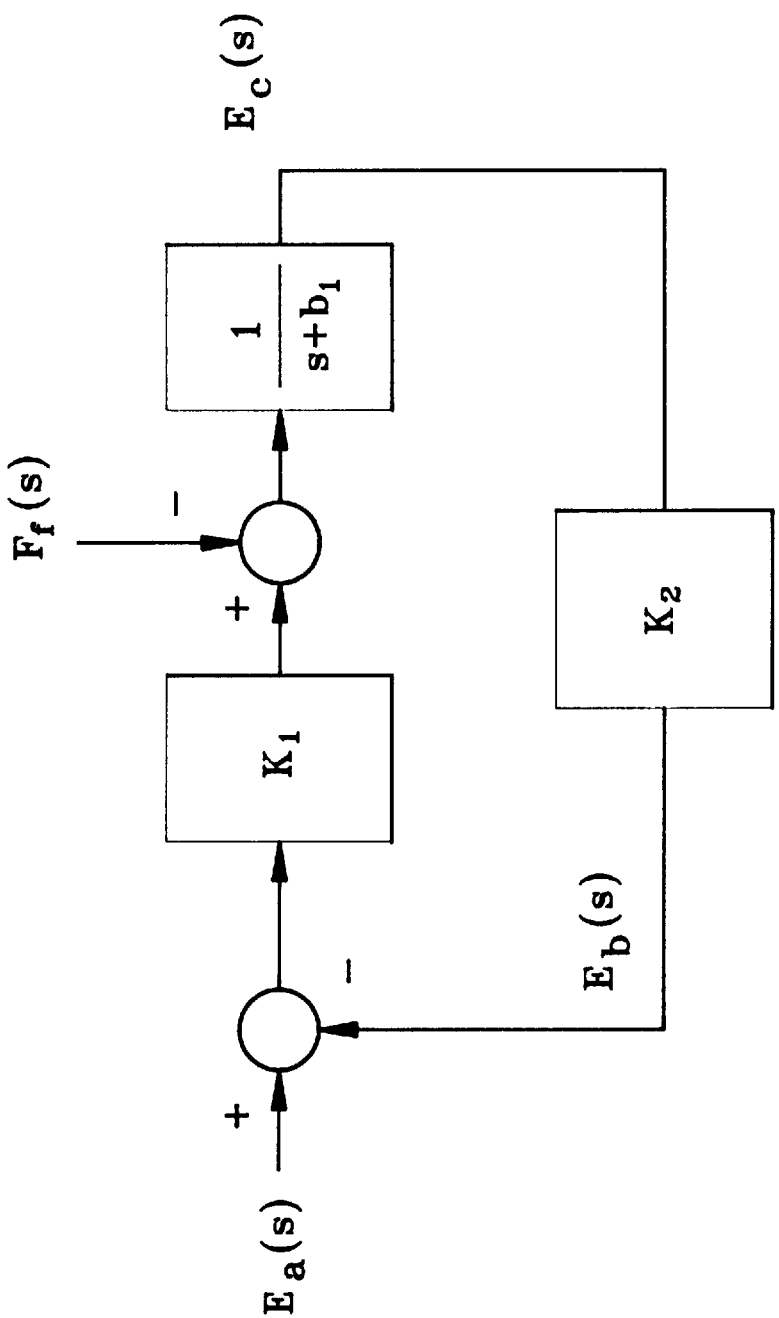
FIG. 8 is a simplified system block diagram of the voice coil motor according to the present invention.

In actual practice, the optical pick-up head 13 does not goes along the ideal reference velocity curve. Because there are nonlinear factors such as change of dynamic or static friction, inertial of velocity mode change, control system time delay, etc., there is a difference between the actual movement of the optical pick-up head 13 and the predetermined ideal reference velocity curve. In an example of the present invention, a NEC 6Xi CD-ROM drive is used and controlled by the control method of the present invention. Before performing the control method, the transfer function of the sled motor of the NEC 6Xi CD-ROM drive must be found out so that the desired controller can be designed. The sled motor of the NEC 6Xi CD-ROM drive uses the sled motor 14 of FIG. 1 which is a voice coil motor 14. The driving magnetic loop of the voice coil motor 14 comprises a magnet 51, a coil 52, and magnetic conductive material. The uniform magnetic field of the magnet 51 acts with the coil 52, causing a magnetic force to be produced. The magnetic conductive material provides a magnetic path. According to Lorentz law, a magnetic force is acted on the coil 52. The intensity of the magnetic force is:

$$F = \gamma L I \times B \tag{1.1}$$

in which:

F: force acted on the coil 52;

I: current at the coil 52;

$\gamma$: ration of effective length and total length of the coil in the magnetic filed;

L: total length of the enamel wire;

B: density of magnetic flux in the air gap;

Because the direction of the electric current is perpendicular to the direction of the magnetic flux density, equation (1.1) can be changed, subject to Fleming's left hand rule, to:

$$F = \gamma L I B \times K_f I \tag{1.2}$$

in which:

$K_f = \gamma L B$ is force constant. In voice coil motor, $\gamma$, L, B are fixed and electric current is directly proportional to force, therefore the movement of the coil 52 can be controlled by controlling the electric current. Because the voice coil motor 14 and the optical pick-up head 13 are directly coupled together, the movement of the optical pick-up head 13 can be accurately controlled. FIG. 5 shows an equivalent circuit of the voice coil motor 14. The velocity of the voice coil motor 14 is a step transfer function relative to input voltage. According to experimentation, the step response is close to one step system. As illustrated in FIG. 6, when different input voltages V1;V2;V3;V4;V5 are provided, different velocity curves v1;v2;v3;v4;v5 are obtained. When input voltage is reduced to zero at 100 msec, the friction force causes the optical pick-up head 13 to be stopped. When a higher input voltage is provided, the displacement of the optical pick-up head passes over the movable range, thereby causing the optical pick-up head 13 to strike against the border, and therefore the velocity curve is suddenly reduced to zero. Because the system does not reach stable state at 100 msec, the velocity curve raises. The mathematics mode of the optical pick-up head 13 can be obtained from the following equations:

$$ea(t) = eb(t) + L1(t)R1 \tag{2.1}$$

$$eb(t) = K_v V(t) \tag{2.2}$$

$$I1(t)BL = ma(t) + Ff + bv(t) \tag{2.3}$$

$$ec(t) = I2(t)R2 = R2 K_s v(t) \tag{2.4}$$

in which:

ea(t)=input voltage m=total weight of optical pick-up head and voice coil motor eb(t)=reverse electrokinetic potential
a(t)=motor acceleration
r1=coil resistance
B=magnetic flux density
v(t)=motor velocity
L=effective wire length
I1(t)=coil current
Ff=friction force
Kv=velocity constant
b=coefficient of adhesion
ec(t)=voltage feedback directly proportional to velocity
R2=resistance of current to voltage
I2(t)=velocity feedback coil current
Ks=constant of velocity to current Further, the system block diagram of the voice coil motor 14 is shown in FIG. 7. The transfer function of the voice coil motor 14 can be obtained only through experimentation. When a sine wave is inputted, the output is not an integrity of a sine wave because the system is changed from friction of motion to friction of rest and then changed from friction of rest to friction of motion. Normally, friction of rest is greater than friction of motion, therefore there is existed a nonlinear feature. Referring to FIG. 6 again, fixed friction can be observed from the raising of the velocity feedback voltage from 0.1 v. At 101 msec, input voltage drops to zero. Thereafter, a reverse electrokinetic potential is caused to raise by a velocity value which is directly proportional to the velocity feedback voltage. Thus, the relationship between Eb(s) and Ec(s) can be known. From FIG. 7, it is known that:

$$\frac{E_b(s)}{E_c(s)} = \frac{K_v}{K_s R_2} \equiv K_2 \quad (3.1)$$

$$E_c(s) = \frac{\frac{BL_{K_2} R_2}{R_1 m} E_a(S)}{s + \frac{b}{m} + \frac{BL_{K_v}}{R_1 m}} - \frac{\frac{K_2 R_2}{R_1 m}}{s + \frac{b}{m} + \frac{BL_{K_v}}{R_1 m}} F_f(s)$$

let $K_1 = \frac{BL_{K_s} R_2}{R_1 m}$, $b_1 = \frac{b}{m}$, $F_f''(s) = \frac{K_s R_2}{R_1 m} F_f(s)$ thus, equation (3.1) can be simplified as:

$$E_c(s) = \frac{K_1}{s + b_1 + K_1 K_2} E_a(s) - \frac{F_f''(s)}{s + b_1 + K_1 K_2} \quad (3.2)$$

the simplified block diagram is as shown in FIG. 8, in which K1, K2, b1, Ff' are constant.

Figure 9:
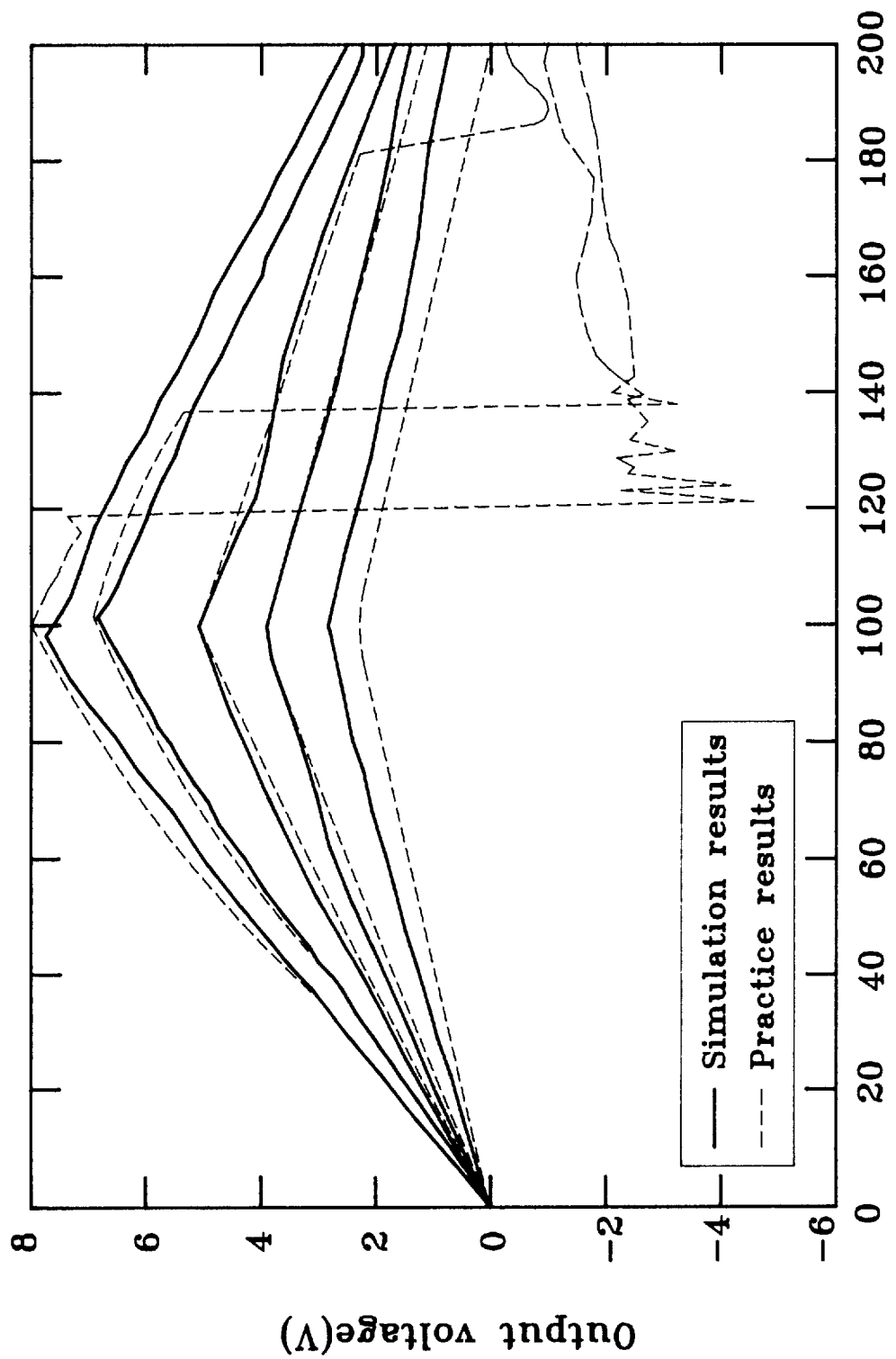
FIG. 9 is a step response chart showing the simulation of the voice coil motor according to the present invention.

From the experimental value shown in FIG. 6, we can obtain that K2=0.052. Because the velocity ascending curve and the velocity descending curve in FIG. 6 are similar to a straight line, b1 and K2 are assumed not to cause a significant interference to the system within a short period of time. Therefore, b1 and K2 are disregarded; the slope of the velocity ascending curve represents acceleration; the slope of velocity reduction which is caused by friction force and initial velocity comprises the information of friction force. When comparing the slope of the velocity accelerating curve and the slope of velocity reduction curve, we can obtain that K1=29.2. The system limit is K1K2+b1. Therefore, b1 is known when the position of the system limit is obtained. Because the voice coil motor 14 is a step system, the position of the system limit and b1 are known through the block diagram of FIG. 8 and several tests as ≈7.45 and ≈6.06 respectively. Using Matlab control tool box to adjust K1, b1 and Ft', a simulation chart can thus be obtained similar to FIG. 6. Referring to FIG. 9, the curves of real line are obtained subject to simulation parameters K1=29.2, K2=0.052, 1=6, Ft'=14, limit is at 7.51. The equation of the voltage signal Ec(s) that is directly proportional to velocity is as follows:

$$E_c(s) = \frac{29.2}{s + 7.51} E_a(s) - \frac{14}{s(s + 7.51)} \quad (4.1)$$

The curves of dotted line in FIG. 9 are actual value measured from FIG. 6. Therefore, the transfer function of the voice coil motor 14 which is obtained by judgment is just a mathematics model which does not completely coincide with the measured value of the system. More particularly, when the velocity is relatively lower, the practice value is lower than the simulation value, and therefore there is a greater error.

Figure 4:
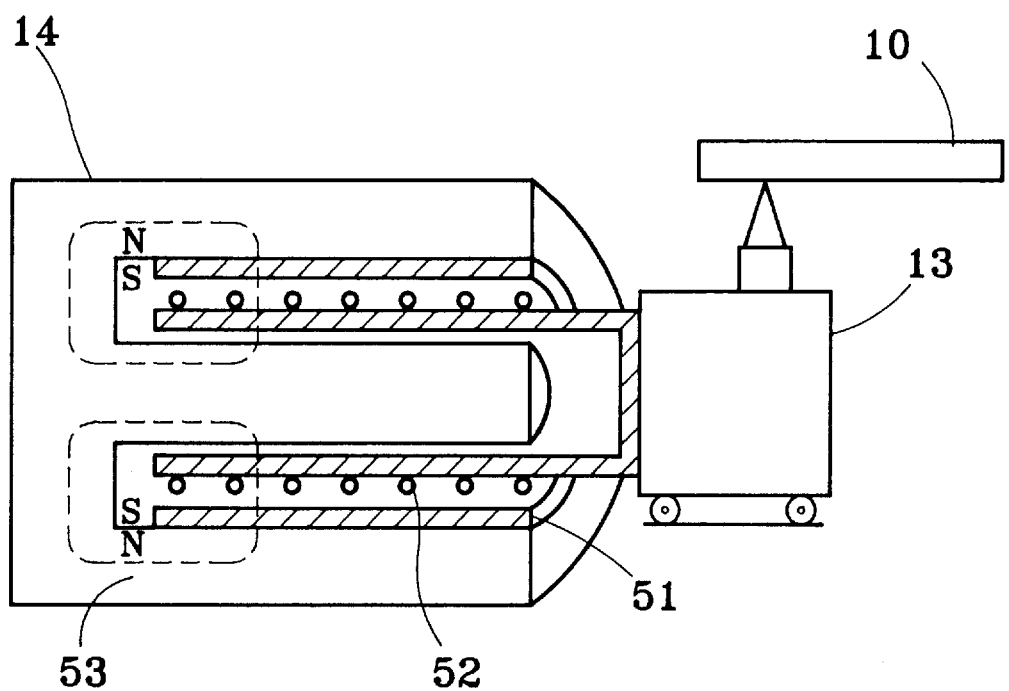
FIG. 4 shows the magnetic circuit of a voice coil motor according to the present invention.
Figure 10:
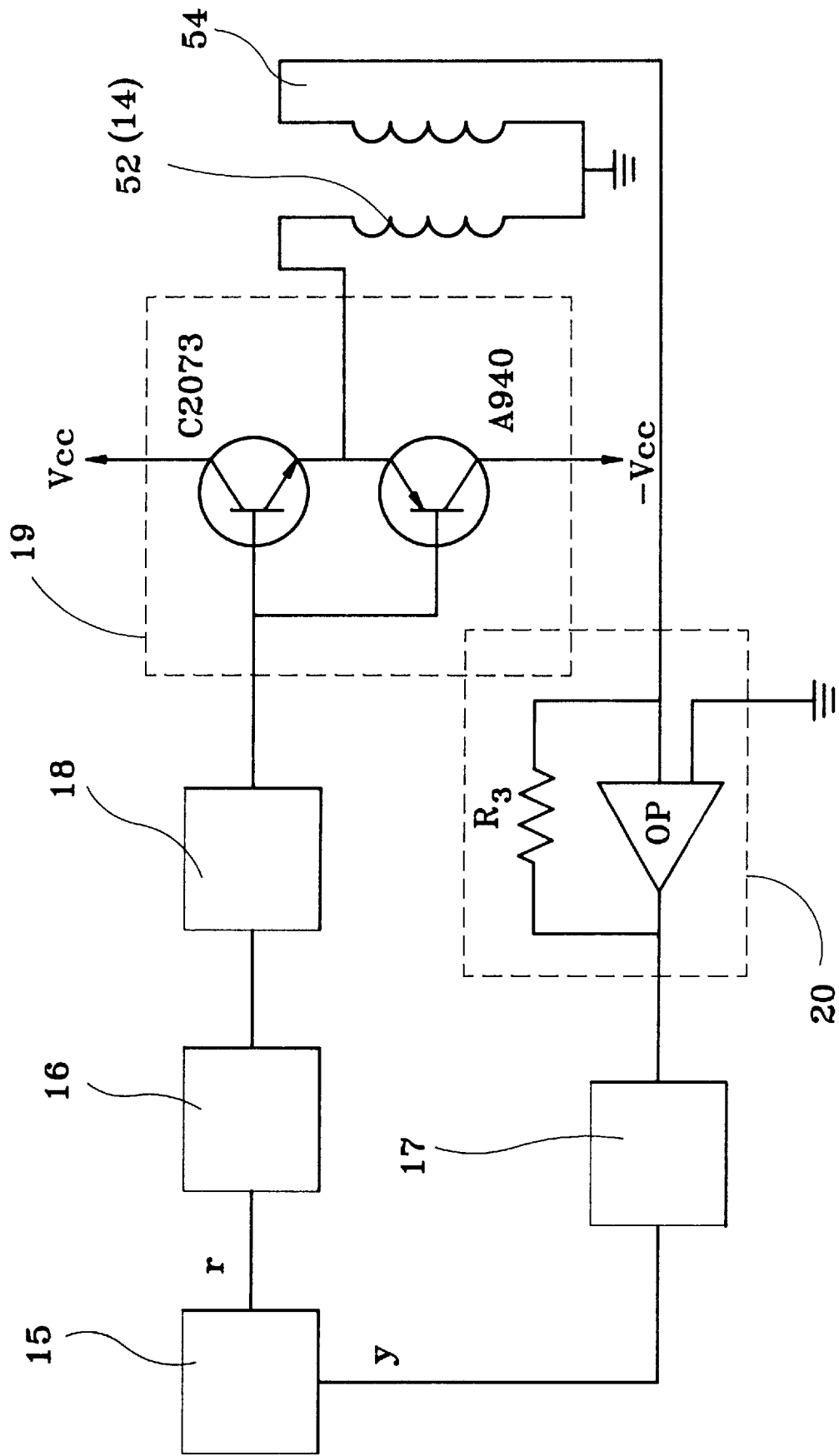
FIG. 10 is a circuit block diagram according to the present invention.

From the aforesaid experiment and system judgment, the transfer function simulating the voice coil motor 14 is determined, and the design of the controller can then be proceeded. The configuration of the control method of the present invention is as shown in FIG. 10, in which the digital controller 15 produces a reference message r subject to the predetermined reference velocity curve a (see FIG. 3). The reference message r is a reference velocity signal r used to let the voice coil motor 14 drive the optical pick-up head 13. The digital controller 15 receives a feedback message y from the voice coil motor 14. The feedback message y can be a velocity feedback signal y representing the actual moving velocity of the voice coil motor 14 and used to let the digital controller 15 adjust the output of the reference velocity signal r. The digital controller 15 is used instead of an analog controller for being able to be modified, capable of executing fuzzy rule to fit system's parameter variation, changing of load and system's nonlinear conditions. The digital controller 15 can be a CPU of a personal computer so that the design of the controller can be simulated by the computer. Because the digital controller 15 is used, D/A (digital to analog) converter 16 and A/D (analog to digital) converter 17 are used for intercommunication between the voice coil motor 15 of the system and the digital controller 15. Please refer to FIG. 1 again, the voice coil motor 14 comprises two coils, namely, the driving coil 52 for driving the optical pick-up head 12 (see FIG. 4) and the feedback coil 54 for detecting the velocity of the voice coil motor 14. Because of the use of the D/A converter 16 and A/D converter 17, sample and hold must be added when analog transfer function is changed to analog transfer function. Therefore, equation (4.1) is re-written into (5.1)

$$y(s) = \frac{K_1}{s + a} x(s) - \frac{K_2}{s + a} T(s) \quad (5-1)$$

$$H_{ZOH} = \frac{1 - e^{-TS}}{S}$$

$$y(z) = \frac{K_1}{a} \left[ \frac{1 - e^{-aT}}{z - e^{-aT}} \right] x(z) \frac{K_2}{a} \left[ \frac{1 - e^{-aT}}{z - e^{-aT}} \right] T_L(z) \quad (5.2)$$

in which, a=7.51, K1=29.2, K2=14, TL(z)=z/(z−1)

When sampling frequency is 1 Khz, T=1 msec $$y(z) = \frac{0.029}{z - 0.9925} x(z) - \frac{0.0139}{z - 0.9925} T_L(z) \quad (5.3)$$

The aforesaid D/A converter 16 and A/D converter 17 are obtained for example from Advantech's PCL818HG card; CPU is obtained for example from Intel 486 DX66; system language is Turbo C. The PCL818HG card has a built-in program capable of processing the action of the D/A converter and the A/D converter. The program execution velocity is as slow as about 500 Hz during a dynamic control. Further, the execution velocity of the PCL818HG card cannot be set as desired. Therefore, the present invention provides a new driving program which uses the pulse generator of the PCL818HG card to provide a square wave for triggering the seventh interruption of the computer I/O, so that dynamic sampling frequency and execution velocity can be accurately obtained. Because the D/A converter 16 can only provide a voltage from 0 V to 10 V and the system of the present invention needs a voltage from −12 V to 12 V, a comparator 18 is added after the D/A converter 16 to convert the voltage to the desired level. Further, a driving circuit 19 is provided between the voice coil motor 14 and the comparator 18. The driving circuit 19 is comprised of a set of coupled BJT transistors of models A940 and C2073. When proceeding a system judgment, it only judges the motor. In actual practices, comparator gain and driving circuit voltage drop will occur. The present invention eliminates the affects of these conditions. Further, the feedback coil 54 of the voice coil motor 14 comprises a current to voltage feedback circuit 20 adapted to convert the current value which is directly proportional to the velocity of the voice coil motor 14 to a voltage value readable to the A/D converter 17. The voltage value readable to the A/D converter 17 is a velocity feedback signal y which is traced by the digital controller 15.

Referring to FIG. 10, the reference velocity curve a which corresponds to the reference velocity signal r is converted by the D/A converter 16 into a stepped trapezoidal curve b. Because the ascending part of the stepped trapezoidal curve b is symmetrical to its descending part, the stepped curve from the D/A converter 16 does not affect the integrated area corresponding to the position of the motor. If to position the optical pick-up head subject to the velocity of the reference velocity curve, the position control is an open loop, and an error caused by external factors cannot be eliminated. When the tracking of the reference velocity curve is finished, the optical pick-up head 13 is moved to nearby the destination, and tracking control is shifted to position control. Please refer to FIG. 11B, the real line c is the velocity curve of the voice coil motor 14, the imaginary line a is the reference velocity curve. By means of velocity control, the actual velocity curve is controlled to follow the reference velocity curve. This stage is the velocity control mode I. The velocity of the voice coil motor 14 is integrated, so as to provide a position feedback signal. The control is a close loop position control. When forced to displace by an interference, it will return to its former position. Therefore, the voice coil motor 14 can be locked. This stage is the position control mode II. The velocity integration of the voice coil motor 14 can be achieved through a software measured integrator. Through a velocity control to rapidly position the voice coil motor 14 and a position control to achieve a fine adjustment, much time is saved in comparison with the position by a position control.

Figure 11A:
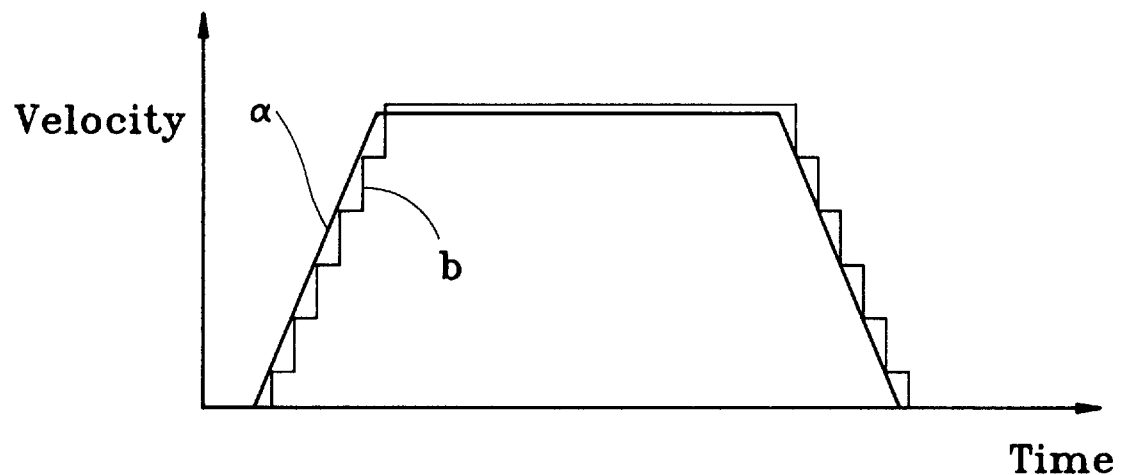
FIG. 11A and FIG. 11B explain the voice coil motor speed control and position control according to the present invention.
Figure 11B:
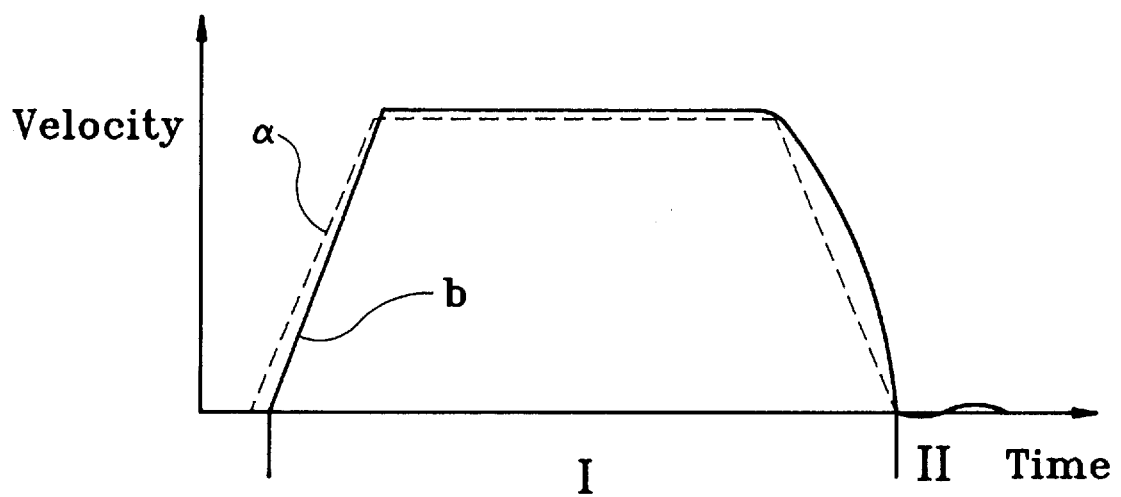
Figure 12:
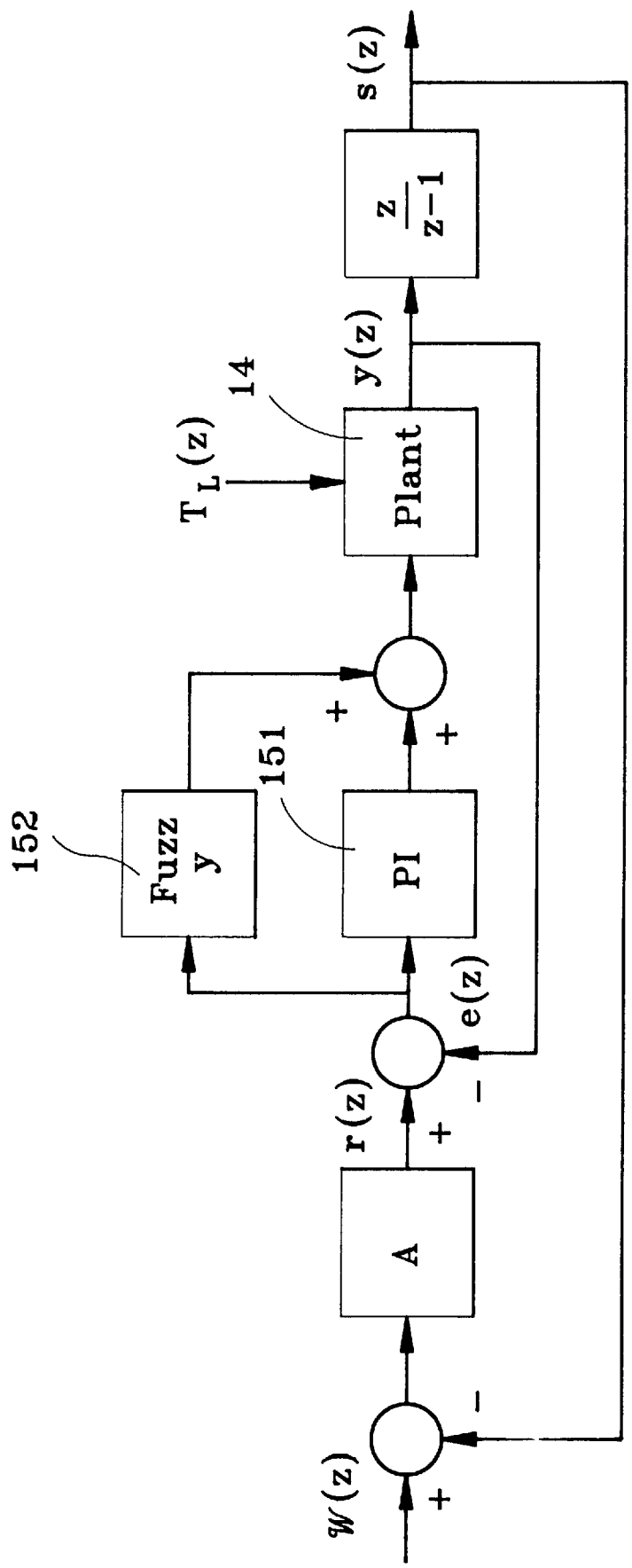
FIG. 12 is a system block diagram according to the present invention.

Referring to FIG. 12, the digital controller 15 which executes the control method of FIG. 11A and 11B to control the velocity of the voice coil motor 14 is comprised of a PI controller 151 and a fuzzy controller 152. In the system block diagram of FIG. 12, the block A is a velocity curve generator when at the velocity control mode I or a proportional controller when at the position control mode II; the block Plant is the transfer function of the controlled field, i.e. the transfer function of the voice coil motor 14; w(z) is a position command signal; s(z) is a position output signal of the voice coil motor 14.

The PI controller 151 controls the velocity of the voice coil motor 14. The fuzzy controller 152 is for fine adjustment. If there is a difference between the feedback velocity of the voice coil motor 14 and the reference velocity, the fuzzy controller 152 immediately outputs a voltage to the voice coil motor 141, causing the voice coil motor system to move along the ideal path. Because the fuzzy controller 152 does not cause any stable oscillation during a fine adjustment, the combination of the PD type fuzzy controller 152 and the PI controller 151 achieves the effect of a PID controller, has nonlinear feature, and is capable of fitting a parameter variation. Therefore, even if the parameter design of the PI controller 151 has a drawback, the combination of the controllers 151;152 works accurately to let the merits of both controllers 151;152 be fully carried out. From the following statement explaining the design procedure of the PI controller 151 and the fuzzy controller 152 and comparing their performance with the prior art optical disk drive control method, the present invention can definitely shorten the average access time.

Figure 13:
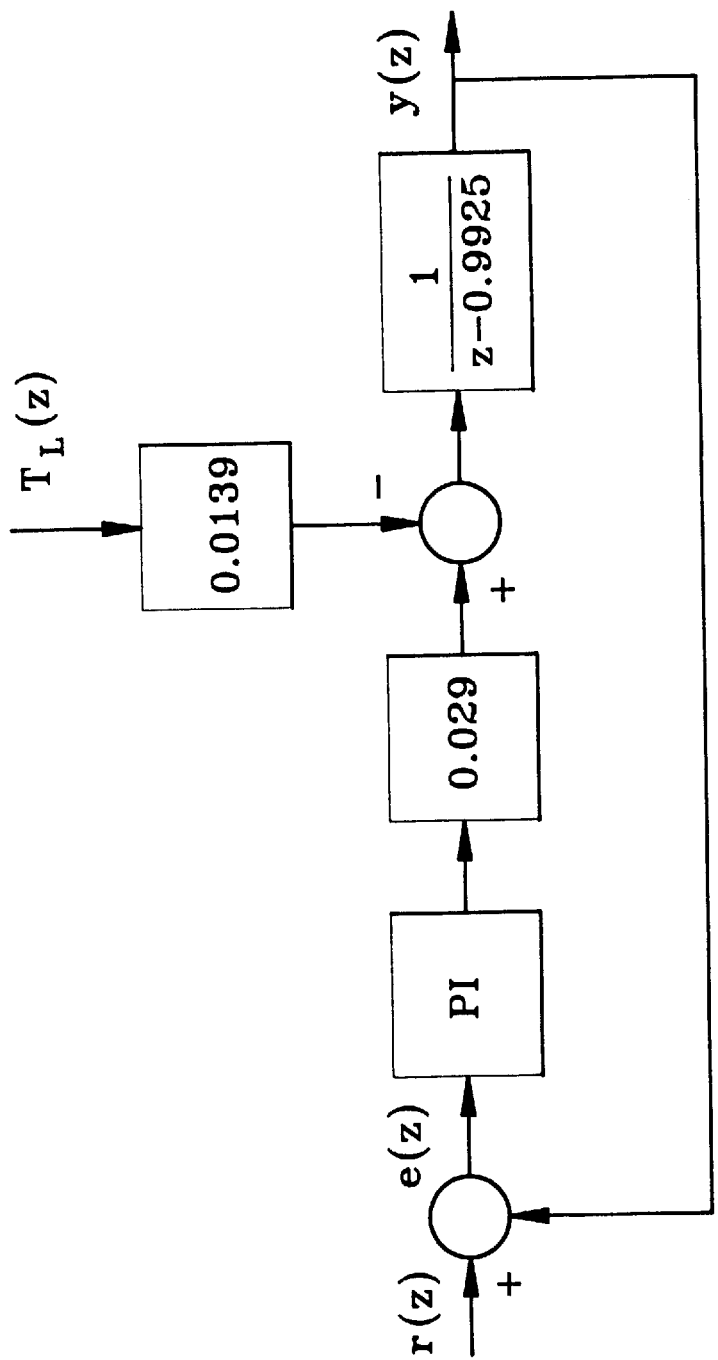
FIG. 13 is a speed control block diagram without a fuzzy controller according to the present invention.

In order to control the velocity of the voice coil motor 14, the PI controller 151 is designed. The velocity servo control block diagram is shown in FIG. 13. When sampling frequency is 1 Khz and T=1 msec, Kpv=34.5, KIv=0.13. Although software simulation results can achieve accurate positioning, it is known at the initial stage that the transfer function of the voice coil motor 14 has a greater error at a low speed, i.e., friction of rest is greater than friction of motion and the transfer function is not accurate when at a low speed. Through a controller of greater Kpv value, an unstable condition of repeated oscillation will occur. Therefore, the values of Kpv and Ktv are respectively adjusted down:

$$y(z) = \frac{0.029}{z - 0.9925} x(z) - \frac{0.0139}{z - 0.9925} T_L(z) \quad (5.3)$$

$$\frac{y(z)}{e(z)} = \frac{0.029[K_{Pv}(z-1) + K_{Iv}(z+1)]}{(z-1)(z-0.9925)} = \frac{0.3}{(z-1)} \quad (5.4)$$

when z=0.9925, Kpv=10.3 and Kiv=0.04, the close loop transfer function of movement velocity y relative to reference velocity r is:

$$y(z) = \frac{0.3}{z - 0.7} r(z) - \frac{0.0139(z-1)}{(z-0.7)(z-0.9925)} T_L(z) \quad (5.5)$$

Figure 14:
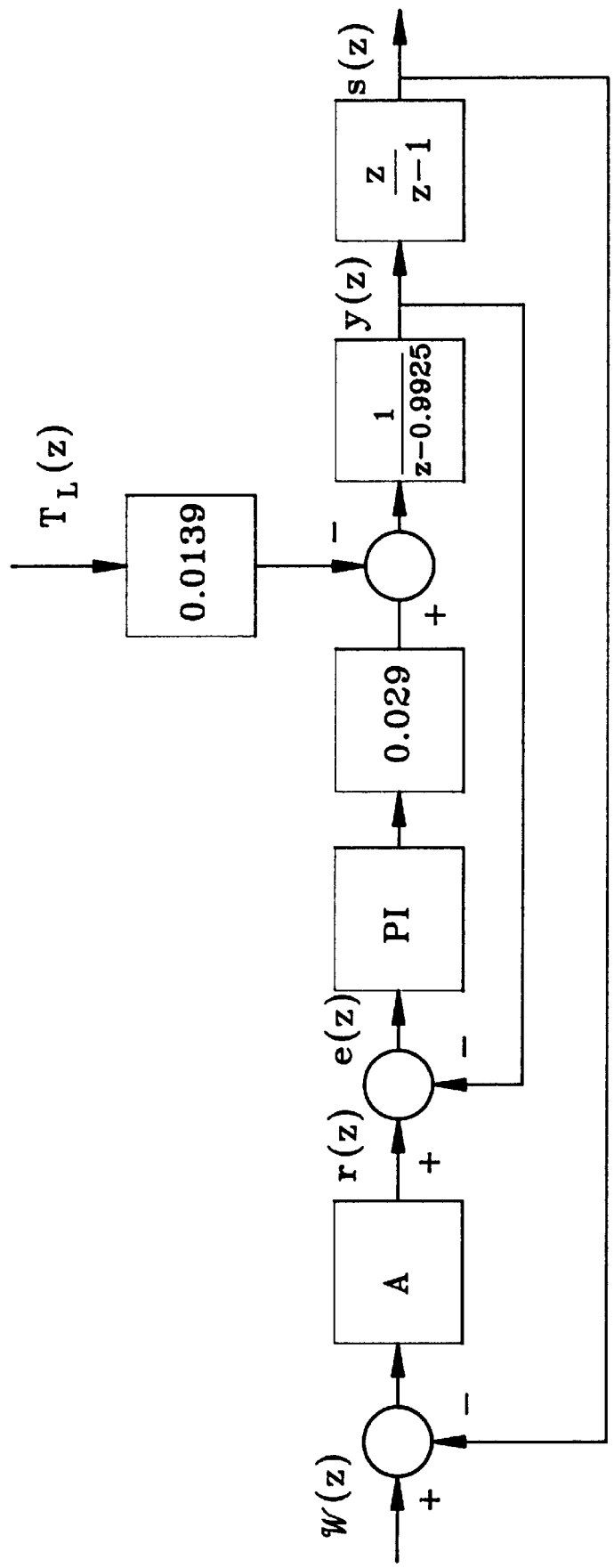
FIG. 14 is a system control block diagram without a fuzzy controller.

Further, after the velocity control mode I, it proceeds to the position control mode II. The block diagram of the whole control system without the fuzzy controller 152 is shown in FIG. 14, in which the block A is a velocity curve generator when at the speed control stage, or a P controller when at the position control stage. After calculation, Kps−0.1.

The fuzzy control is designed by specialists which includes fuzzy rules set up by means of intuition, concept and experiences. The action of the fuzzy controller is to input an error e and the amount of error variation Δe, permitting the input to be turned to a fuzzy amount after through fuzzifier, then to let the fuzzy amount trigger fuzzy control rules so as to obtain an output fuzzy amount through a fuzzy corollary, and then the fuzzy amount is reversely fuzzified to provide an accurate control output. The setting of a fuzzy control rule table concerns the action of the fuzzy controller. The application of the fuzzy control to a velocity control is outlined hereinafter. At first, the following variables are defined:

$e=0-S$ $\Delta e=ek-1-ek$ in which 0=actual motor velocity measured; S=the set amount of reference velocity; ek−1 and ek are velocity errors at K−1 time state and K time state respectively; U=the output voltage of the fuzzy controller 152. The present invention adopts a PD type fuzzy controller for fine adjustment without causing a stable oscillation. The rules are shown in follow table I:

TABLE 1

| U  |    |    |    | Δe |    |    |    |
|----|----|----|----|----|----|----|----|
| e  | NB | NM | NS | ZO | PS | PM | PB |
| NB | PB | PB | PB | PB | PM | PS | ZO |
| NM | PB | PB | PB | PM | PS | ZO | NS |
| NS | PB | PB | PM | PS | ZO | NS | NM |
| ZO | PB | PM | PS | ZO | NS | NM | NB |
| PS | PM | PS | ZO | NS | NM | NB | NB |
| PM | PS | ZO | NS | NM | NB | NB | NB |
| PB | ZO | NS | NM | NB | NB | NB | NB | in which:
1. PB: forward, large
2. PM: backward, medium
3. PS: forward, small
4. ZO: zero
5. NS: backward, small
6. NM: backward, medium
7. NB: backward, large In case e=NB and Δe=ZO, thus U=PB, that means a large voltage is provided to raise the velocity of the motor when the motor velocity is far from the reference value and the variation of error is small; in case e=ZO and Δe=PB, thus U=NB, that means a large negative voltage is provided to constrain the increasing of the motor velocity when the motor velocity is close to the reference velocity and the variation of error is large. During the simulation of the software, the aforesaid variables e, Δe and U are defined into 11 grades as shown in Table I, and the detailed table of rules is shown in Table III.

TABLE II

| Δe   | e    | U  | Quantization |
|------|------|----|--------------|
| -2.5 | -0.5 | -5 | -5           |
| -2   | -0.4 | -4 | -4           |
| -1.5 | -0.3 | -3 | -3           |
| -1   | -0.2 | -2 | -2           |
| -0.5 | -0.1 | -1 | -1           |
| 0    | 0    | 0  | 0            |
| 0.5  | 0.1  | 1  | 1            |
| 1    | 0.2  | 2  | 2            |
| 1.5  | 0.3  | 3  | 3            |
| 2    | 0.4  | 4  | 4            |
| 2.5  | 0.5  | 5  | 5            |

TABLE III

| U  |    |    |    |    |    |    |    |    |    |    |    |
|----|----|----|----|----|----|----|----|----|----|----|----|
| e  | -5 | -4 | -3 | -2 | -1 | 0  | 1  | 2  | 3  | 4  | 5  |
| -5 | 5  | 5  | 5  | 4  | 3  | 3  | 2  | 2  | 1  | 1  | 0  |
| -4 | 5  | 5  | 4  | 4  | 3  | 3  | 2  | 2  | 1  | 0  | -1 |
| -3 | 5  | 4  | 4  | 3  | 3  | 3  | 2  | 1  | 0  | -1 | -2 |
| -2 | 4  | 4  | 3  | 3  | 3  | 2  | 1  | 0  | -1 | -2 | -2 |
| -1 | 4  | 3  | 3  | 3  | 2  | 1  | 0  | -1 | -2 | -2 | -2 |
| 0  | 3  | 3  | 2  | 2  | 1  | 0  | -1 | -2 | -2 | -2 | -3 |
| 1  | 3  | 2  | 2  | 1  | 0  | -1 | -2 | -2 | -2 | -3 | -3 |
| 2  | 2  | 2  | 1  | 0  | -1 | -1 | -2 | -2 | -3 | -3 | -4 |
| 3  | 2  | 1  | 0  | -1 | -1 | -2 | -2 | -3 | -3 | -4 | -4 |
| 4  | 1  | 0  | -1 | -1 | -1 | -2 | -2 | -3 | -4 | -4 | -5 |
| 5  | 0  | -1 | -1 | -1 | -2 | -2 | -3 | -4 | -4 | -5 | -5 |

Figure 15A:
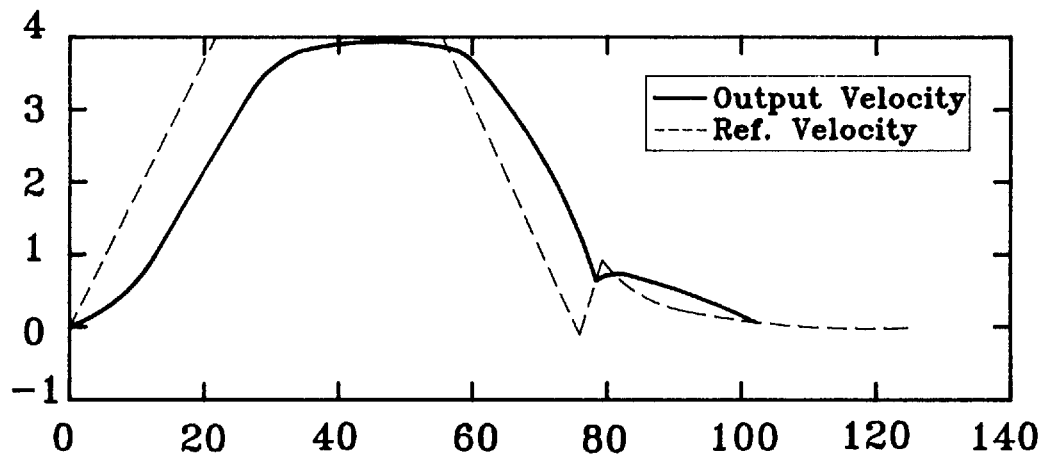
FIG. 15A and FIG. 15B show a system output from error PI parameters when simulated by a software without a fuzzy controller.
Figure 15B:
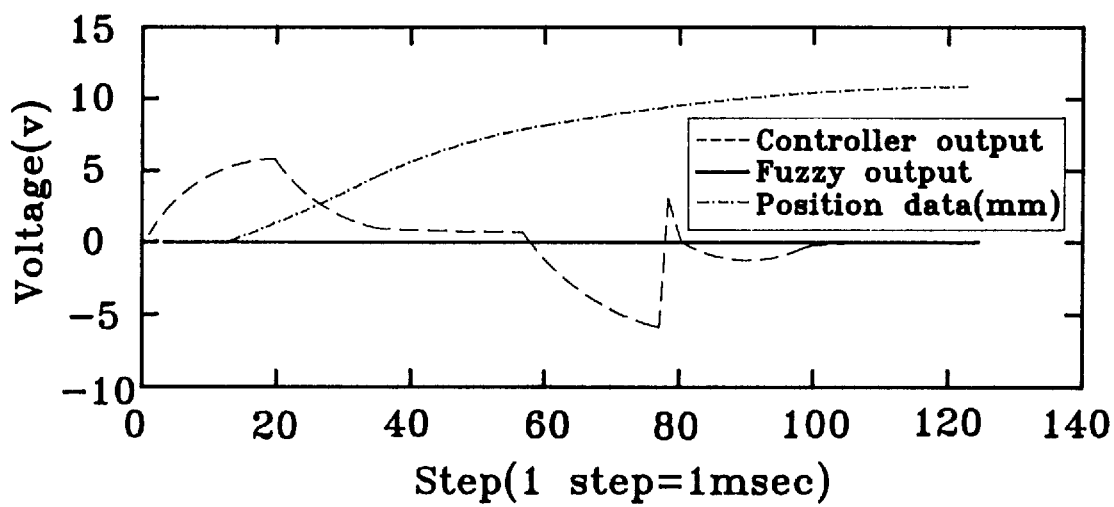
Figure 16A:
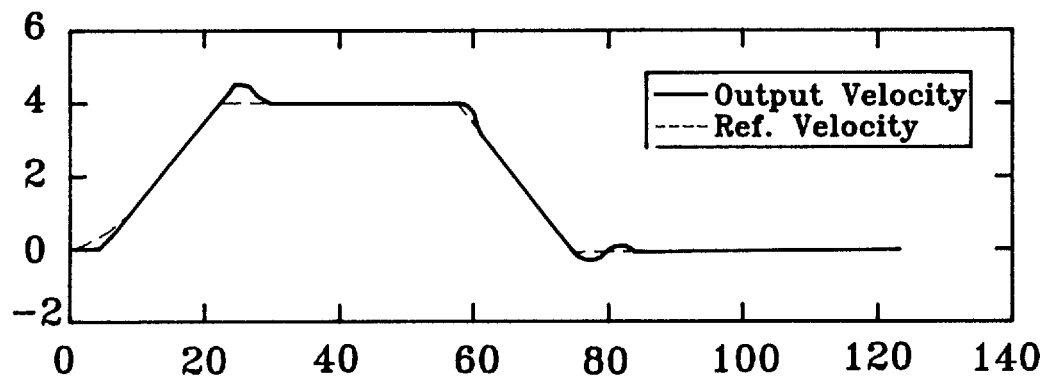
FIG. 16A and FIG. 16B show a system output from error PI parameters when simulated by the control method of the present invention.
Figure 16B:
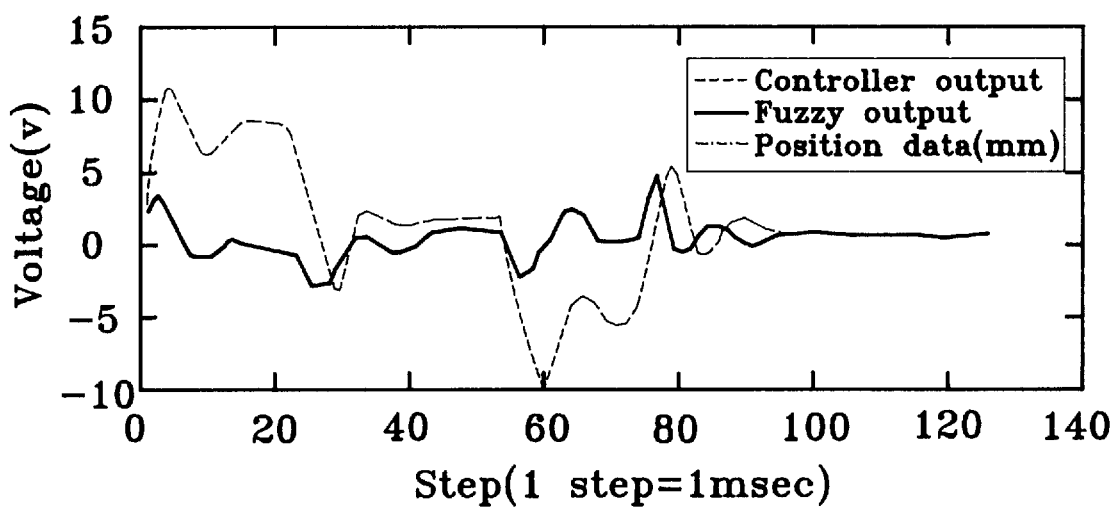
Figure 17A:
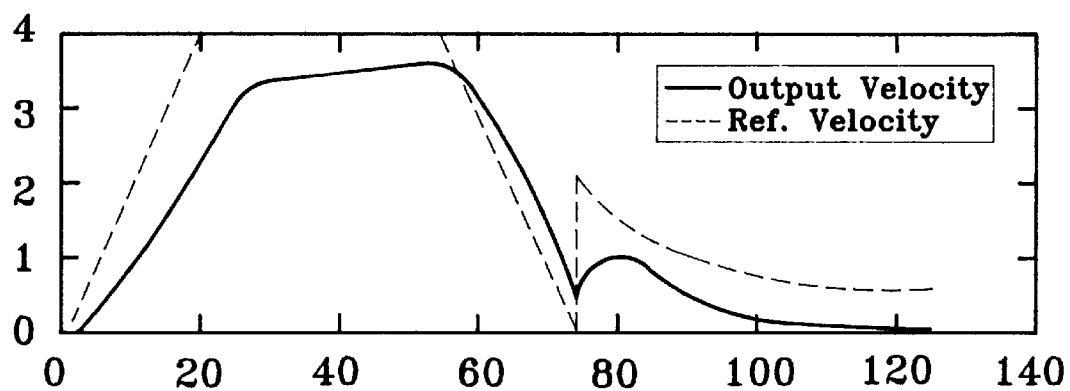
FIG. 17A and FIG. 17B show a system output from a variation of PI parameters when simulated by a software without a fuzzy controller.
Figure 17B:
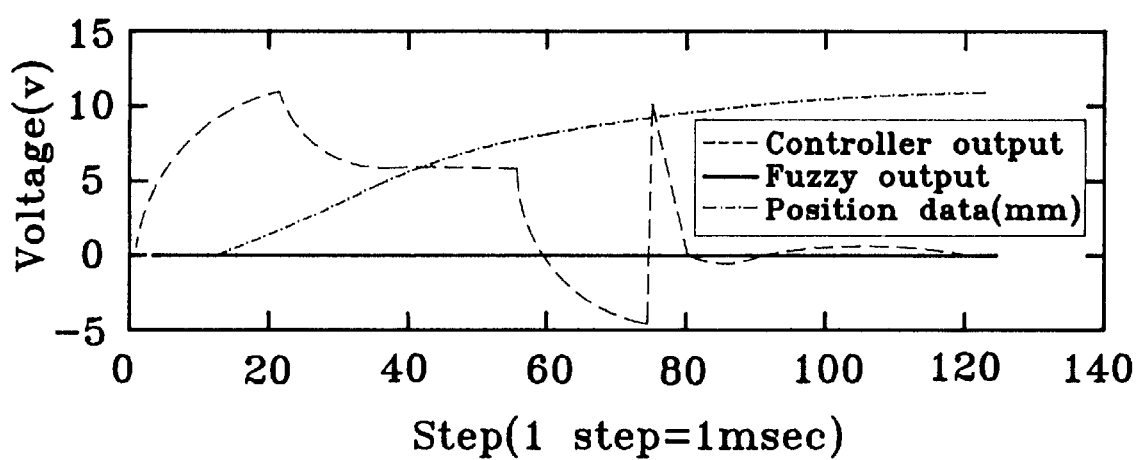
Figure 18A:
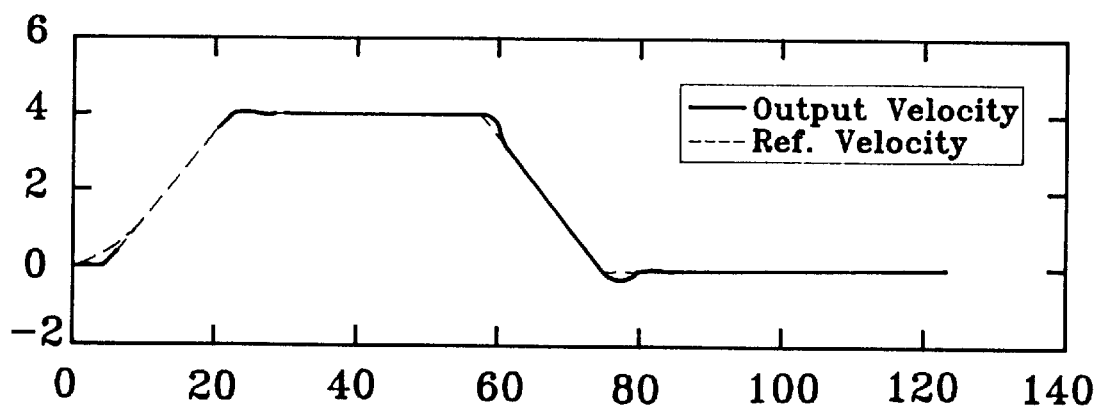
FIG. 18A and FIG. 18B show a system output from a variation of PI parameters when simulated by the control method of the present invention.
Figure 18B:
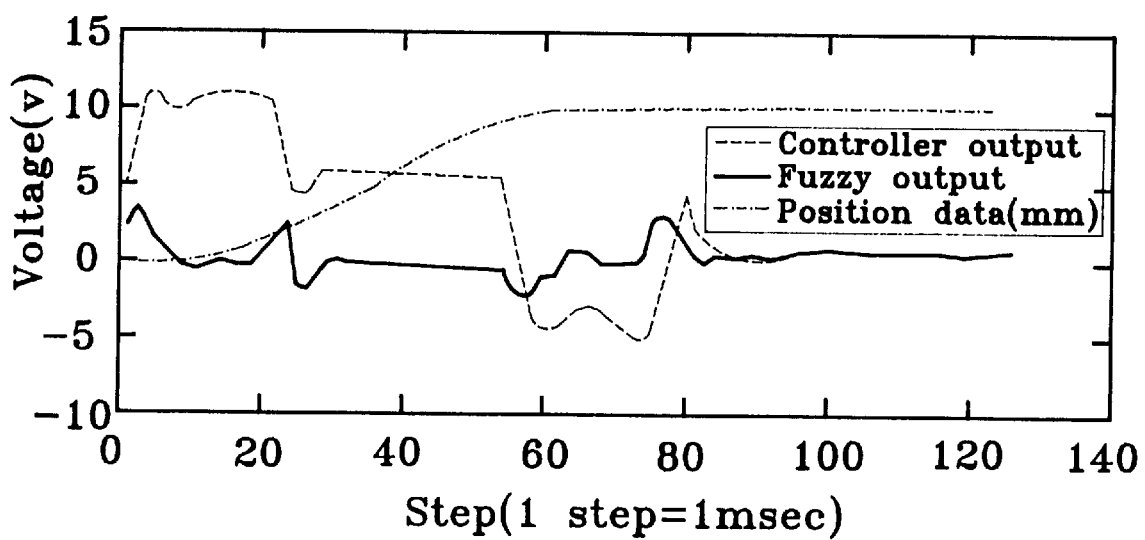

Therefore, the fuzzy controller 152 can perform actions simulated by a software program in a computer subject to the fuzzy rules of the aforesaid Table III. A variety of PI controllers are combined to make tests and three possible conditions are discussed, so that the advantages of the combination of the PI controller with the fuzzy controller are explained:

The first condition is an improper parameter design of the PI controller which may be resulted from a design error made by the designer or an improper use. In the control system of the voice coil motor 141, we set for example Kpv=6, Kiv=0.01 and Kps=0. When the fuzzy controller 152 is not added, the output curve of the PI controller, the output curve of the fuzzy controller and the velocity curve are shown in FIG. 15. As shown in FIG. 15, there is a great difference between the reference velocity and the motor velocity, and therefore a length of time is wasted in position control adjustment. FIG. 16 shows the effect of the fuzzy controller 152. As shown in FIG. 16, when the motor velocity curve deviates from the reference curve, the fuzzy controller 152 immediately provides a voltage for compensation. The PI controller can only smoothly change the output value of the controller. However, when the fuzzy controller is added, the system can then control the output value of the controller sharply to quickly modify the motor velocity upon an error, causing it to be returned to the accurate reference curve.

The second condition is an inaccuracy of system judgment or a variation of system parameter. The system of the voice coil motor 14 may have these problems, because within the moving range in the track, the friction is relatively smaller at the front half part of the moving range and relatively greater at the rear half part thereof. Based on the PI parameter value of the system transfer function from the original judgment, Kpv=10.3, KIv=0.04, Kps=0.1. FIG. 7 shows a poor result when the fuzzy controller is not added. FIG. 8 shows a satisfactory result of the system response when the fuzzy controller is added, i.e., the positioning is done within 73 msec, and 73 msec is the expected time to be used for the reference velocity curve.

Figure 19A:
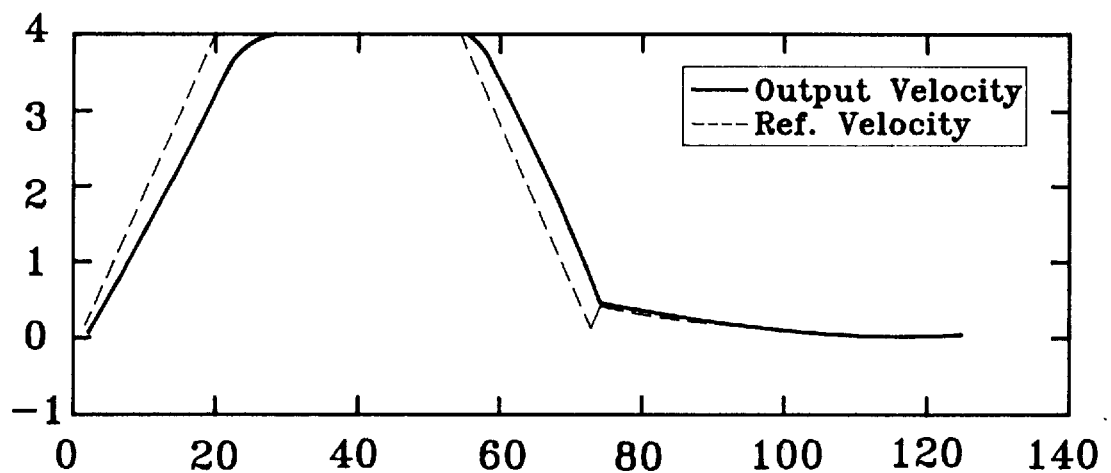
FIG. 19A and FIG. 19B show a system output from the original PI parameter when simulated by a software without a fuzzy controller.
Figure 19B:
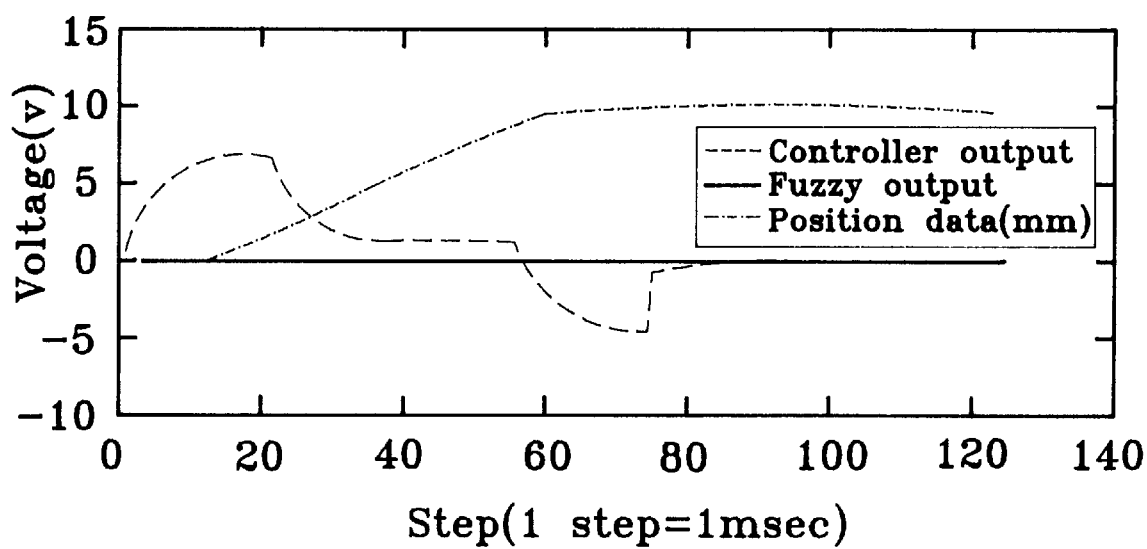
Figure 20A:
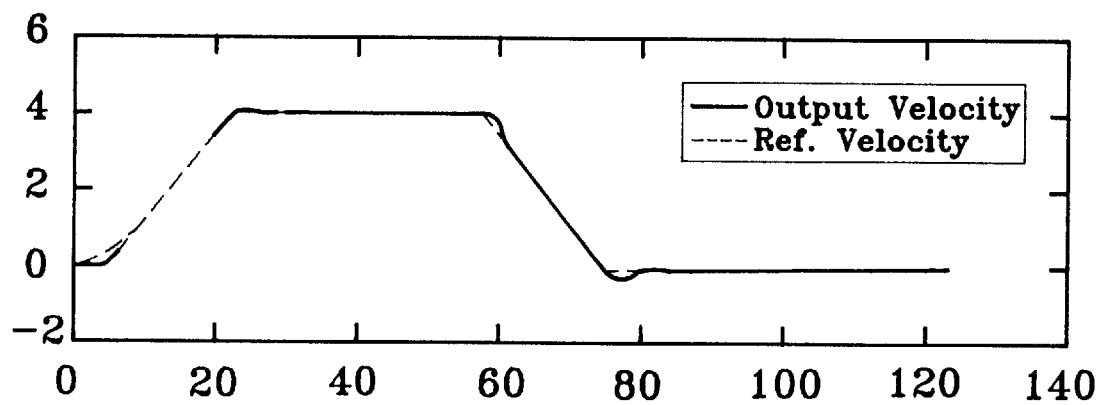
FIG. 20A and FIG. 20B show a system output from the original PI parameter when simulated by the control method of the present invention.
Figure 20B:
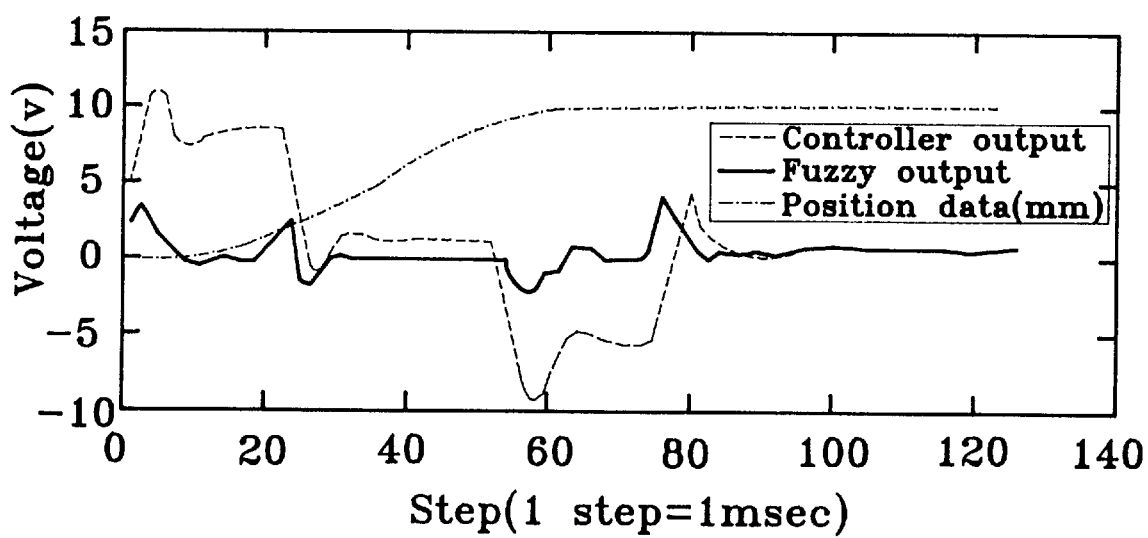

The third condition is the effect of the adding of the fuzzy controller when system judgment and PI parameter are accurate. Please refer to FIG. 19A and 19B. The original design of Kpv=10.3, Kiv=0.04, Kps=0.1 indicates the friction force is as expected and the positioning time is 79 msec. FIG. 20A and 20B shows the positioning time is improved to 73 msec when the fuzzy controller 152 is added. As indicated, PI plus the fuzzy controller greatly improve the result no matter how the variation of system parameter is, or how the accuracy of the PI parameter value is.

After the success of a simulation, some conditions must be taken into account during actual practice, for example, a transfer error of the A/D converter and the D/A converter, interference of noises, etc. Actually, the velocity of the motor cannot be as fast as the reference velocity when at a low speed. Therefore, it is recommended to adjust the unit of the error e and error variation amount Δe to a big scale and the unit of the output amount to a small scale to prevent from being overstrict in correcting errors. It is also recommended to set Kpv=14, Kiv=0, Kps=0.2. The adjusted quantization table and fuzzy rule table are shown in Table IV and Table V. In Table V, the present invention adjusted two rules. One is that, when Δe is close to zero and e is a small negative value, the output 1 in Table III is reduced to 0.4. This adjustment prevents an overshoot at the constant speed motion due to an excessive compensation upon an increasing of the speed. The other adjustment is that when Δe is close to zero and e is a small positive value, the output -1 in Table III is reduced to 0. Because there is an error caused by the friction force during the increasing of the speed, no compensation is needed during the reducing of the speed unless the error is great. This adjustment slows down the speed of the motor to compensate the error occurred during the increasing of the speed. Therefore the system works normally when the system parameter is remained unchanged, and a proper compensation is provided when the system parameter is changed.

TABLE IV

| Δe | e | U | Quantization |
|---|---|---|---|
| -1.5 | -3 | -0.75 | -5 |
| -1.2 | -2.4 | -0.6 | -4 |
| -0.9 | -1.8 | -0.45 | -3 |
| -0.6 | -1.2 | -0.3 | -2 |
| -0.3 | -0.6 | -0.15 | -1 |
| 0 | 0 | 0 | 0 |
| 0.3 | 0.6 | 0.15 | 1 |
| 0.6 | 1.2 | 0.3 | 2 |
| 0.9 | 1.8 | 0.45 | 3 |
| 1.2 | 2.4 | 0.6 | 4 |
| 1.5 | 3 | 0.75 | 5 |

TABLE V

| U / e | -5 | -4 | -3 | -2 | -1 | 0 | 1 | 2 | 3 | 4 | 5 |
|---|---|---|---|---|---|---|---|---|---|---|---|
| -5 | 5 | 5 | 5 | 4 | 3 | 3 | 2 | 2 | 1 | 1 | 0 |
| -4 | 5 | 5 | 4 | 3 | 3 | 3 | 2 | 2 | 1 | 0 | -1 |
| -3 | 5 | 4 | 4 | 3 | 3 | 3 | 2 | 1 | 0 | -1 | -2 |
| -2 | 4 | 4 | 3 | 3 | 3 | 2 | 1 | 0 | -1 | -2 | -2 |
| -1 | 4 | 3 | 3 | 3 | 2 | 1 | 0 | -1 | -2 | -2 | -2 |
| 0 | 3 | 3 | 2 | 2 | 1 | 0 | -1 | -2 | -2 | -2 | -3 |
| 1 | 3 | 2 | 2 | 1 | 0 | -1 | -2 | -2 | -2 | -3 | -3 |
| 2 | 2 | 2 | 1 | 0 | -1 | -1 | -2 | -2 | -3 | -3 | -4 |
| 3 | 2 | 1 | 0 | -1 | -1 | -2 | -2 | -3 | -3 | -4 | -4 |
| 4 | 1 | 0 | -1 | -1 | -1 | -2 | -2 | -3 | -4 | -4 | -5 |
| 5 | 0 | -1 | -1 | -1 | -2 | -2 | -3 | -4 | -4 | -5 | -5 |

Figure 21A:
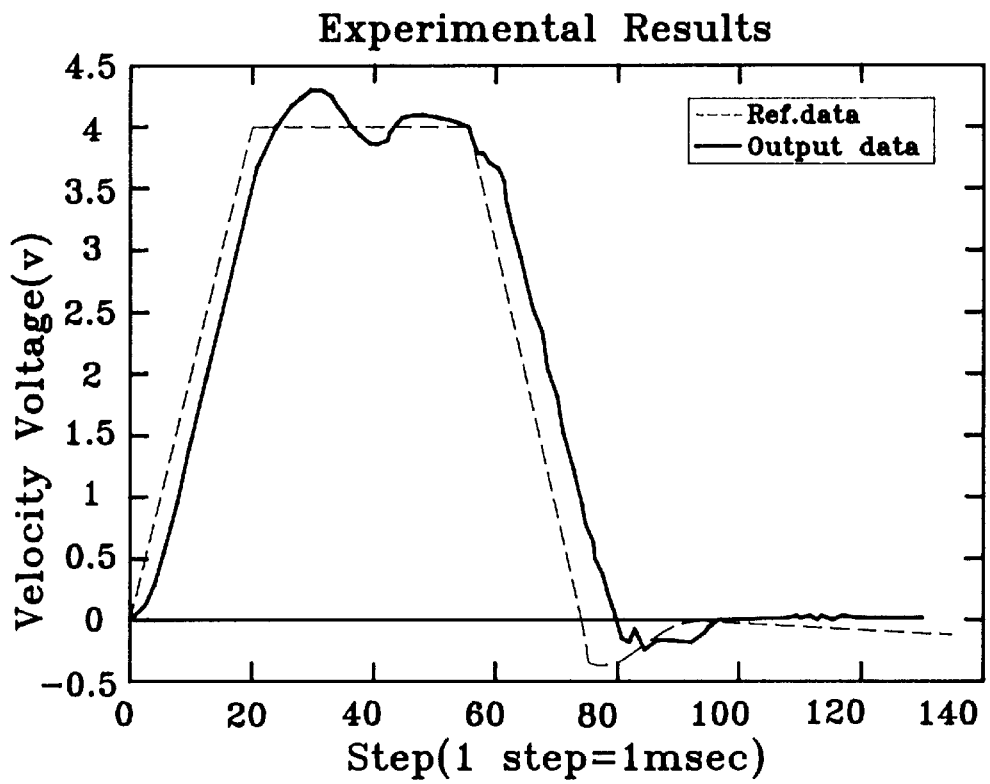
FIG. 21A and FIG. 21B show experimental results obtained from the application of the control method of the present invention.
Figure 21B:
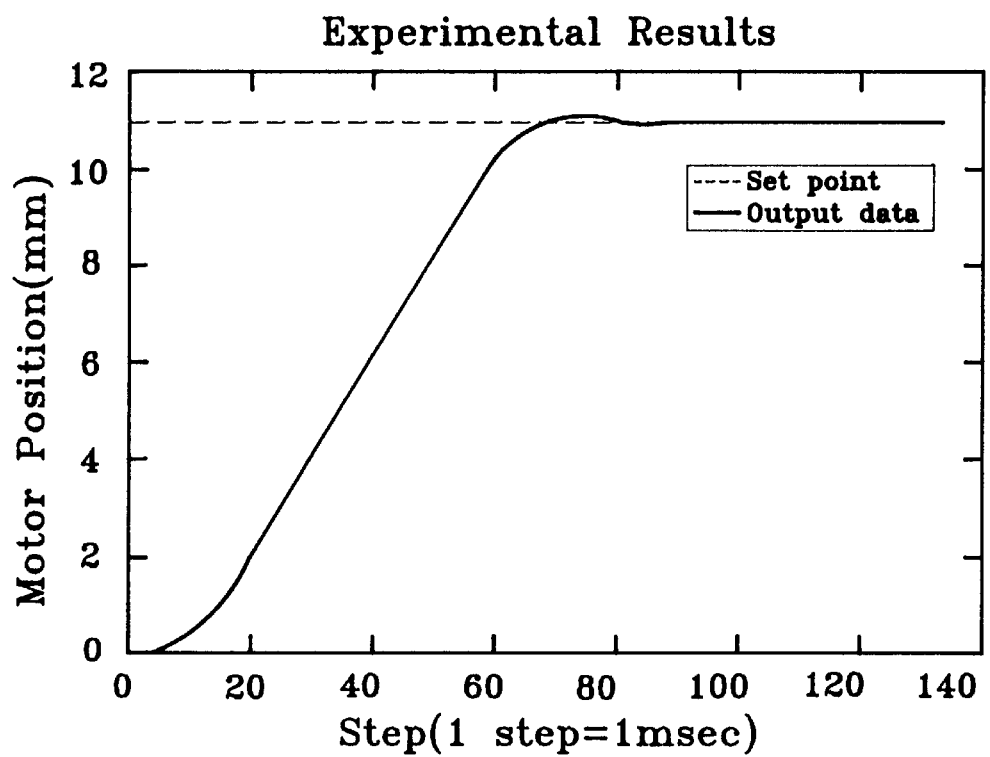
Figure 22A:
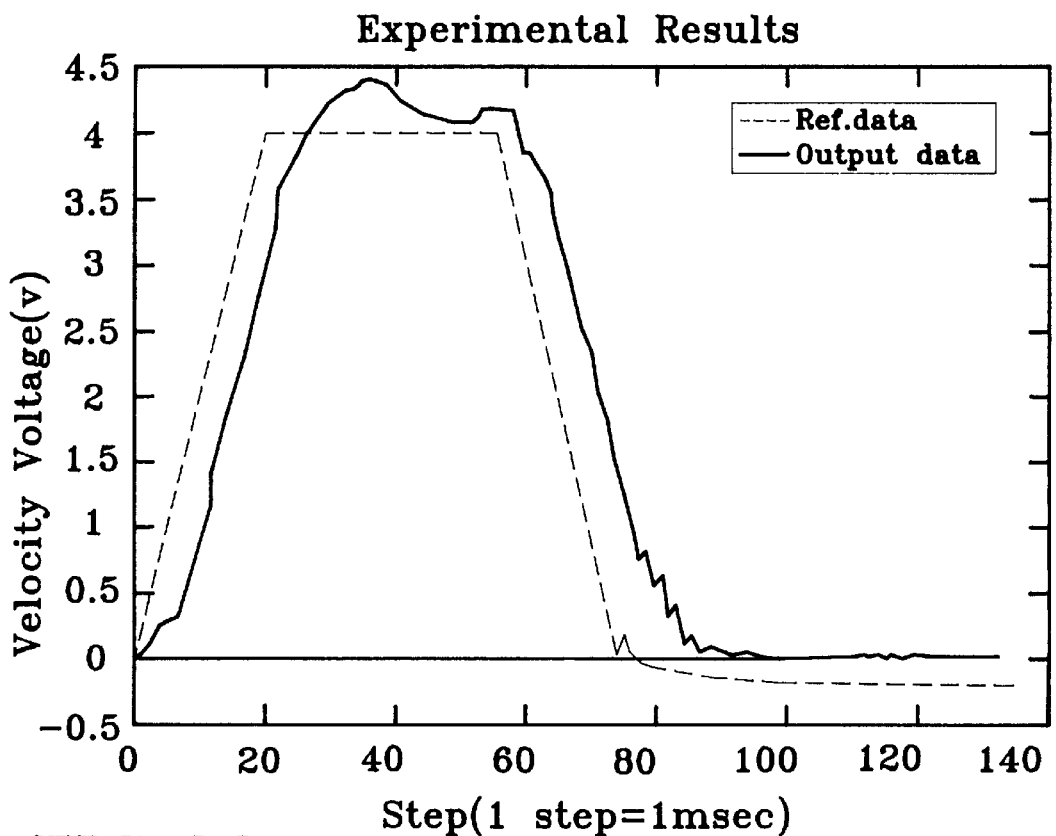
FIG. 22A and FIG. 22B show experimental results obtained from the application of the control method of the present invention upon a variation of the system parameter.
Figure 22B:
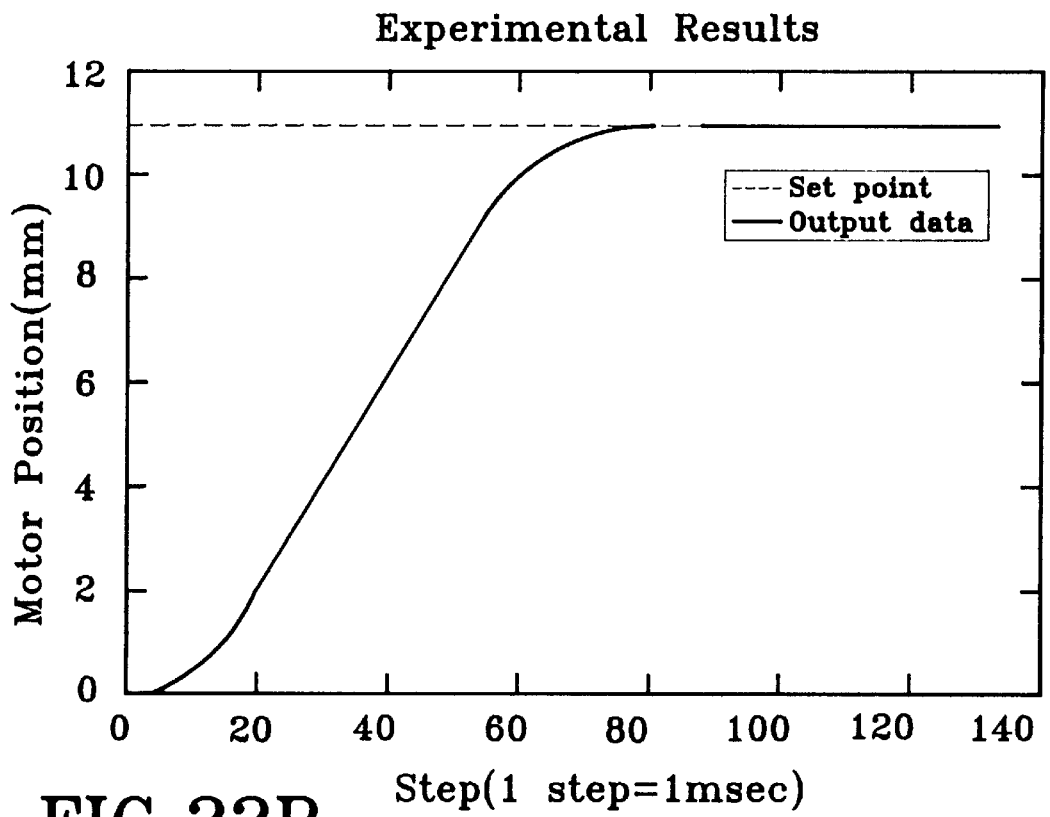

Please refer to FIG. 21A and 21B. FIG. 21A shows a velocity curve obtained from the voice coil motor 14 controlled by the PI controller and the fuzzy controller when the voice coil motor 14 moved 11 mm during the front half of the moving range. The parameters of the PI controller 151 are Kpv=14, Kiv=0, Kps=0.2. The fuzzy controller 152 is operated subject to Table V. FIG. 21B shows a position curve. As illustrated, the positioning time is 73 msec which is the limit of the system. The original reference speed needs this length of time for positioning. FIG. 22A shows a velocity curve obtained the voice coil motor 14 controlled by the PI controller and the fuzzy controller when the voice coil motor 14 moved 11 mm during the rear half of the moving range. Because the velocity error is relatively increased when the friction force is increased, the positioning is done accurately when at 73 msec, as shown in FIG. 22B. As a control result of the present invention, the average positioning time of NEC 6Xi CD-ROM drive is shortened from 80–100 msec to 73–80 msec., i.e. about 14 msec is shortened. The aforesaid experiments are made at Industrial Technology Research Institute Mechanical Industry Research Laboratories.

Figure 23A:
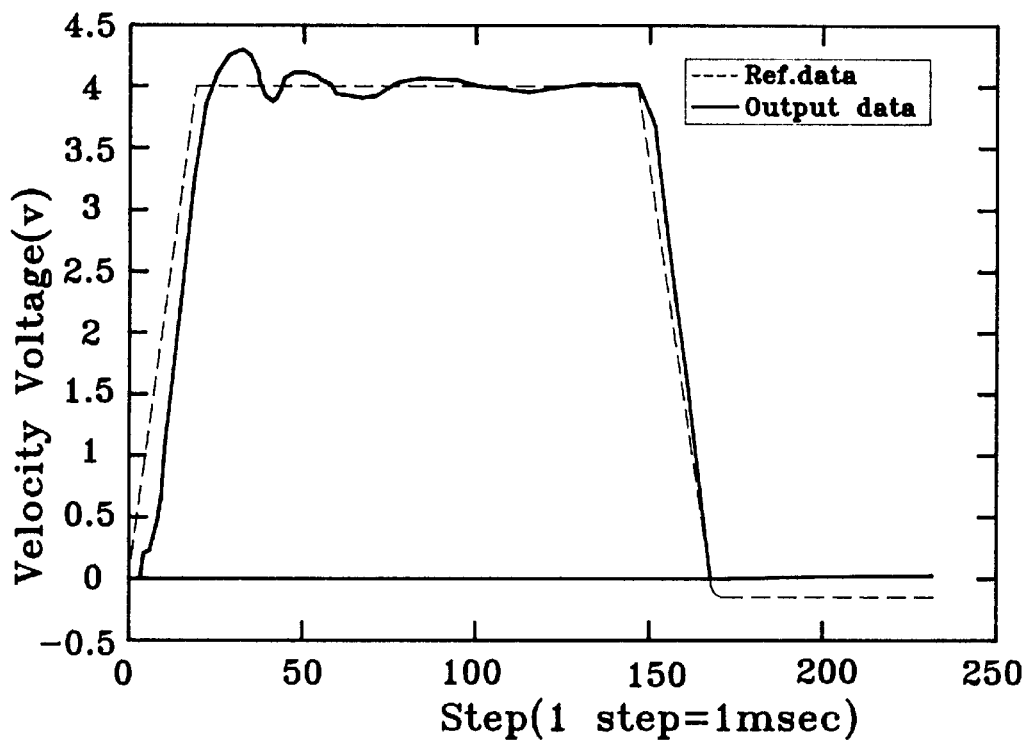
FIG. 23A and FIG. 23B show experimental results obtained from the application of the control method of the present invention when the moving distance increased to 30 mm.
Figure 23B:
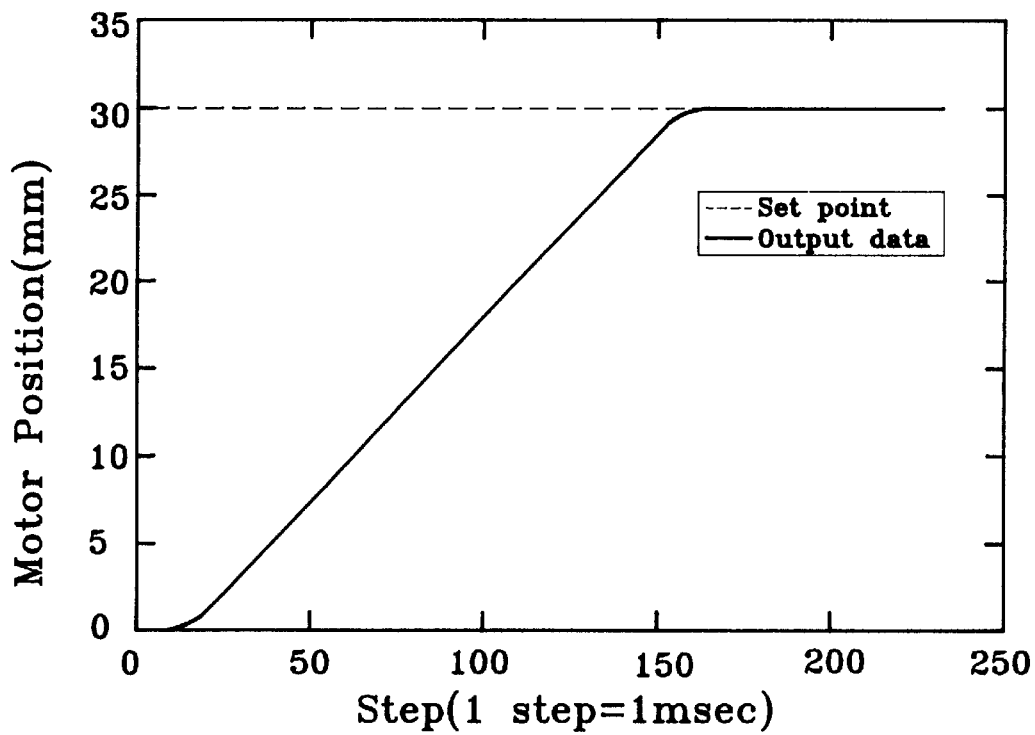

With respect to other moving distance for example 30 mm, please refer to FIGS. 23A and 23B, the positioning time is 150 msec. The positioning is done without a fine adjustment.

The aforesaid statement explains the control direction of the present invention on the voice coil motor 14. Although the structure of a regular optical disk drive which is driven by a DC motor through a transmission gear is not quite the same as the voice coil motor system of the present invention, a specially designed fuzzy controller can still be used to eliminate nonlinear factors of gear gaps of the transmission gear because the equivalent circuit and the motion equation are similar, and the application of the control method of the present invention can effectively shorten the access time.

Further, the embodiment of the present invention is constructed on a CPU. Because a CPU has may works to inquire and its program execution time is difficult to be controlled, the digital controller is changed to a simple chip so that its operation can be fully controlled to fit actual optical disk drive's application.

According to the present invention, the velocity and the positioning are separately controlled, i.e., when a tracking command is given, the short seeking servo is released, and the sled motor is controlled to move to nearby the destination, and then the fine seeking, tracking servo control is executed to lock the track. Therefore, a mixed control method can be used, i.e., fine seeking tracking servo and sled servo are simultaneously operated, and the system is a MIMO system, thus the average access time is minimized.

We claim:

1. An intelligent optical disk drive control method for rapidly and accurately controlling the movement of an optical pick-up head of an optical disk drive, comprising the steps of:

(a) defining a movement mode for the optical pick-up head;

(b) providing a reference message according to the movement mode defined by step (a);

(c) moving the optical pick-up head according to the reference message provided by step (b), and providing a feedback message subject to the actual movement of the optical pick-up head when the optical pick-up head is moved; and (d) comparing the feedback message with the reference message, then using a fuzzy control and a proportional integration control to adjust the movement mode of the optical pick-up head subject to the comparison result, so as to let the actual movement mode of the optical pick-up head follow the predetermined movement mode;

wherein the movement mode defined at step (a) is to accelerate the movement of said optical pick-up head to a designated velocity then to keep said optical pick-up head moving at the designated velocity, and then to slow down the velocity of said optical pick-up head by negative acceleration when approaching the destination, so as to let said optical pick-up head be stopped at the desired location; said process of the step of predetermining the movement mode of said optical pick-up head can be shown by a time-velocity equilateral trapezium curve; the area below the equilateral trapezium curve is the distance within said optical pick-up head is to be moved.

2. The control method of claim 1, wherein the optical pick-up head is driven by a driving motor, said driving motor being a voice coil motor coupled to said optical pick-up head and controlled to accelerate the movement of said optical pick-up head to a designated velocity, then to keep said optical pick-up head moving at the designated velocity, and then to slow down the velocity of said optical pick-up head by negative acceleration when approaching the destination, so as to let said optical pick-up head be stopped at the desired location.

3. An intelligent optical disk drive control method for rapidly and accurately controlling the movement of an optical pick-up head of an optical disk drive comprising the steps of:

(a) defining a movement mode for the optical pick-up head:

(b) providing a reference message according to the movement mode defined by step (a);

(c) moving the optical pick-up head according to the reference message provided by step (b) and providing a feedback message subject to the actual movement of the optical pick-up head when the optical pick-up head is moved; and (d) comparing the feedback message with the reference message, then using a fuzzy control and a proportional integration control to adjust the movement mode of the optical pick-up head subject to the comparison result, so as to let the actual movement mode of the optical pick-up head follow the predetermined movement mode;

wherein the procedure of defining a movement mode for said optical pick-up head of said step (a) is to define the moving speed of said optical pick-up head subject to the distance at which said optical pick-up head has to be moved; the reference message of said step (b) is a reference speed signal adapted to let the speed of said optical pick-up head follow the speed to which said reference speed signal corresponds.

4. The control method of claim 3, wherein said reference speed signal is provided by a CPU (central processing unit) subject to a calculation based on the movement mode defined by said step (a) and generate a corresponding reterence speed output signal.

5. An intelligent optical disk drive control method for rapidly and accurately controlling the movement of an optical pick-up head of an optical disk drive, comprising the steps of:

(a) defining a movement mode for the optical pick-up head:

(b) providing a reference message according to the movement mode defined by step (a);

(c) moving the optical pick-up head according to the reference message provided by step (b), and providing a feedback message subject to the actual movement of the optical pick-up head when the optical pick-up head is moved: and (d) comparing the feedback message with the reference message, then using a fuzzy control and a proportional integration control to adjust the movement mode of the optical pick-up head subject to the comparison result, so as to let the actual movement mode of the optical pick-up head follow the predetermined movement mode:

wherein said reference message of said step (c) includes a digital reference speed signal, said digital reference speed signal being generated by a digital controller, then converted into an analog reference speed signal by a digital/analog converter, and then inputted into a driving mechanism, causing said driving mechanism to move said optical pick-up head.

6. The control method of claim 5, wherein said digital controller is a CPU (central processing unit).

7. The control method of claim 5, wherein said feedback message of said step (c) is a speed feedback signal representing the actual moving speed of said optical pick-up head, said speed feedback signal being fed back to said digital controller.

8. The control method of claim 7, wherein said speed feedback signal is an analog speed feedback signal produced by a feedback means according to the actual moving speed of the driving motor in driving said optical pick-up head, said analog speed feedback signal being converted into a digital speed feedback signal by an analog/digital converter and then sent back to said digital controller.

9. The control method of claim 8, wherein said digital controller is comprised of a PI (proportional integration) controller and a fuzzy controller, and is adapted to process said reference speed signal and said digital feedback signal, so as to simultaneously proceed a proportional integration and a fuzzy control on the driving motor.

10. The control method of claim 9, wherein said PI controller is designed subject to the transfer function of the driving motor; said fuzzy controller is used for fine adjustment to prevent the occurrence of a stable oscillation, and provides a control voltage to the driving motor when there is a difference between the actual moving speed of the driving motor which is represented by said speed feedback signal and the ideal moving speed which is represented by said reference speed signal, causing the speed of the driving motor to follow up the expected ideal speed.

11. The control method of claim 9, wherein said fuzzy controller is a PD type fuzzy controller.

12. The control method of claim 10 wherein said step (d) further comprises the sub-steps of:

(d1) comparing said speed feedback signal with said digital reference speed signal, so as to find out at least one speed error (e) between the actual speed of the driving motor and the set point of the reference speed curve;

(d2) calculating the error variation ($\Delta e$) of the speed errors (e) between two adjacent time states subject to the speed error (e) between the actual speed of the driving motor and the set point of the reference speed curve; and (d3) providing a compensation signal for controlling the speed of the driving motor subject to a fuzzy rules chart which corresponds to said speed error (e) and said error variation ($\Delta e$).

13. The control method of claim 12 wherein said fuzzy rules chart is set up according to experts' experience, and said fuzzy controller is operated subject to said fuzzy rules chart.

14. The control method of claim 13 wherein when the value of the error variation ($\Delta e$) is close to zero and the value of the speed error (e) is a small negative value during the establishment of said fuzzy rules chart, the relative compensation signal prohibits the actual moving speed of the driving motor to cause an over shoot.

15. The control method of claim 13 wherein when the value of the error variation ($\Delta e$) is close to zero and the value of the speed error (e) is a small positive value during the establishment of said fuzzy rules chart, the relative compensation signal is zero to buffer the descending speed of the driving motor, so as to compensate the error caused by the increasing of friction force during the increasing of the actual moving speed of the driving motor.

16. The control method of claim 12 further comprising the steps of:

(e) integrating the actual moving speed of the driving motor represented by said feedback message of said step (d), so as to obtain the actual displacement of said optical pick-up head; and (f) comparing the actual displacement of said optical pick-up head with its predetermined displacement, then switching to a positioning control when said optical pick-up head is moved to nearby the predetermined position, so as to let said optical pick-up head be accurately positioned at the predetermined position.

17. The control method of claim 16 wherein said digital controller comprises a proportional controller during the positioning control.

18. The control method of claim 17 wherein said proportional controller is a reference speed generator before entering the positioning control.

19. The control method of claim 2 wherein the driving motor is a DC motor coupled to said optical pick-up head by a transmission mechanism.

* * * * *